US012549184B2

(12) United States Patent
Kishinami et al.

(10) Patent No.: US 12,549,184 B2
(45) Date of Patent: Feb. 10, 2026

(54) SEMICONDUCTOR INTEGRATED CIRCUIT, INTERFACE DEVICE, AND MEMORY SYSTEM

(71) Applicant: Kioxia Corporation, Tokyo (JP)

(72) Inventors: Keisuke Kishinami, Kamakura Kanagawa (JP); Koji Ooiwa, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 159 days.

(21) Appl. No.: 18/460,489

(22) Filed: Sep. 1, 2023

(65) Prior Publication Data

US 2024/0213984 A1 Jun. 27, 2024

(30) Foreign Application Priority Data

Dec. 21, 2022 (JP) ................. 2022-204702

(51) Int. Cl.
*H03K 19/0185* (2006.01)
*G11C 16/04* (2006.01)
*G11C 16/06* (2006.01)
*H03K 19/00* (2006.01)

(52) U.S. Cl.
CPC . *H03K 19/018514* (2013.01); *G11C 16/0483* (2013.01); *G11C 16/06* (2013.01); *H03K 19/0013* (2013.01); *H03K 19/018528* (2013.01)

(58) Field of Classification Search
CPC ....... H03K 19/018514; H03K 19/0013; H03K 19/018528; H03K 19/018521; G11C 16/0483; G11C 16/06
See application file for complete search history.

(56) References Cited

U.S. PATENT DOCUMENTS

| 9,590,594 | B2 | 3/2017 | Kozuma |
| 10,483,962 | B2 | 11/2019 | Shin |
| 2012/0068755 | A1 | 3/2012 | Yamamoto et al. |
| 2015/0256157 | A1 | 9/2015 | Kozuma |
| 2018/0026627 | A1 | 1/2018 | Shin |
| 2022/0182059 | A1 | 6/2022 | Yagi |
| 2024/0106348 | A1* | 3/2024 | Yagi ................. H03K 3/356113 |
| 2024/0154608 | A1* | 5/2024 | Delshadpour ..... H04L 25/03878 |

FOREIGN PATENT DOCUMENTS

JP 2022-088997 A 6/2022

* cited by examiner

*Primary Examiner* — Amir Zarabian
*Assistant Examiner* — Justin Bryce Heisterkamp
(74) *Attorney, Agent, or Firm* — Kim & Stewart LLP

(57) ABSTRACT

A semiconductor integrated circuit includes a first circuit generating a differential third signal based on a first signal, a second circuit generating a second signal from a third signal, wherein the second circuit includes a first signal line and a second signal line for transmitting the third signal from the first circuit to the second circuit, and a third circuit including a first terminal connected to the first signal line and a second terminal connected to the second signal line. The third circuit includes first and second electrical paths with different electrical resistances, that are connected in parallel between the first terminal and the second terminal, and is controlled to switch between the first and second electrical paths.

20 Claims, 13 Drawing Sheets

SEMICONDUCTOR INTEGRATED CIRCUIT, INTERFACE DEVICE, AND MEMORY SYSTEM

CROSS-REFERENCE TO RELATED APPLICATION(S)

This application is based upon and claims the benefit of priority from Japanese Patent Application No. 2022-204702, filed Dec. 21, 2022, the entire contents of which are incorporated herein by reference.

FIELD

Embodiments described herein relate generally to a semiconductor integrated circuit, an interface device, and a memory system.

BACKGROUND

In the related art, level shift circuits have been employed sometimes for signal transmission between electric circuits that use different power supply voltages. For example, a level shift circuit used for signal transmission from an electrical circuit using a certain power supply voltage to an electrical circuit using a higher power supply voltage includes a low voltage circuit and a high voltage circuit. Here, the level shift circuit generates a high voltage output signal from a low voltage input signal. In such a type of level shift circuit, a resistive circuit may be employed to reduce inter-symbol interference (ISI) that occurs in the output signal. However, a level shift circuit has a problem in that a through current flows and power consumption increases due to the resistive circuit.

DETAILED DESCRIPTION

Embodiments provide a semiconductor integrated circuit, an interface device, and a memory system which are capable of reducing ISI and power consumption.

In general, according to one embodiment, a semiconductor integrated circuit is a semiconductor integrated circuit for converting a differential first signal having a first voltage into a second signal having a second voltage that is higher than the first voltage, the semiconductor integrated circuit including a first circuit configured to generate a differential third signal based on the first signal, and a second circuit configured to generate the second signal from the third signal, in which the second circuit includes a first signal line and a second signal line for transmitting the third signal from the first circuit to the second circuit, and a third circuit including a first terminal connected to the first signal line and a second terminal connected to the second signal line. The third circuit includes first and second electrical paths with different electrical resistances, that are connected in parallel between the first terminal and the second terminal, and is controlled to switch between the first and second electrical paths.

Hereinafter, embodiments will be described in detail with reference to the drawings.

First Embodiment

Figure 1:
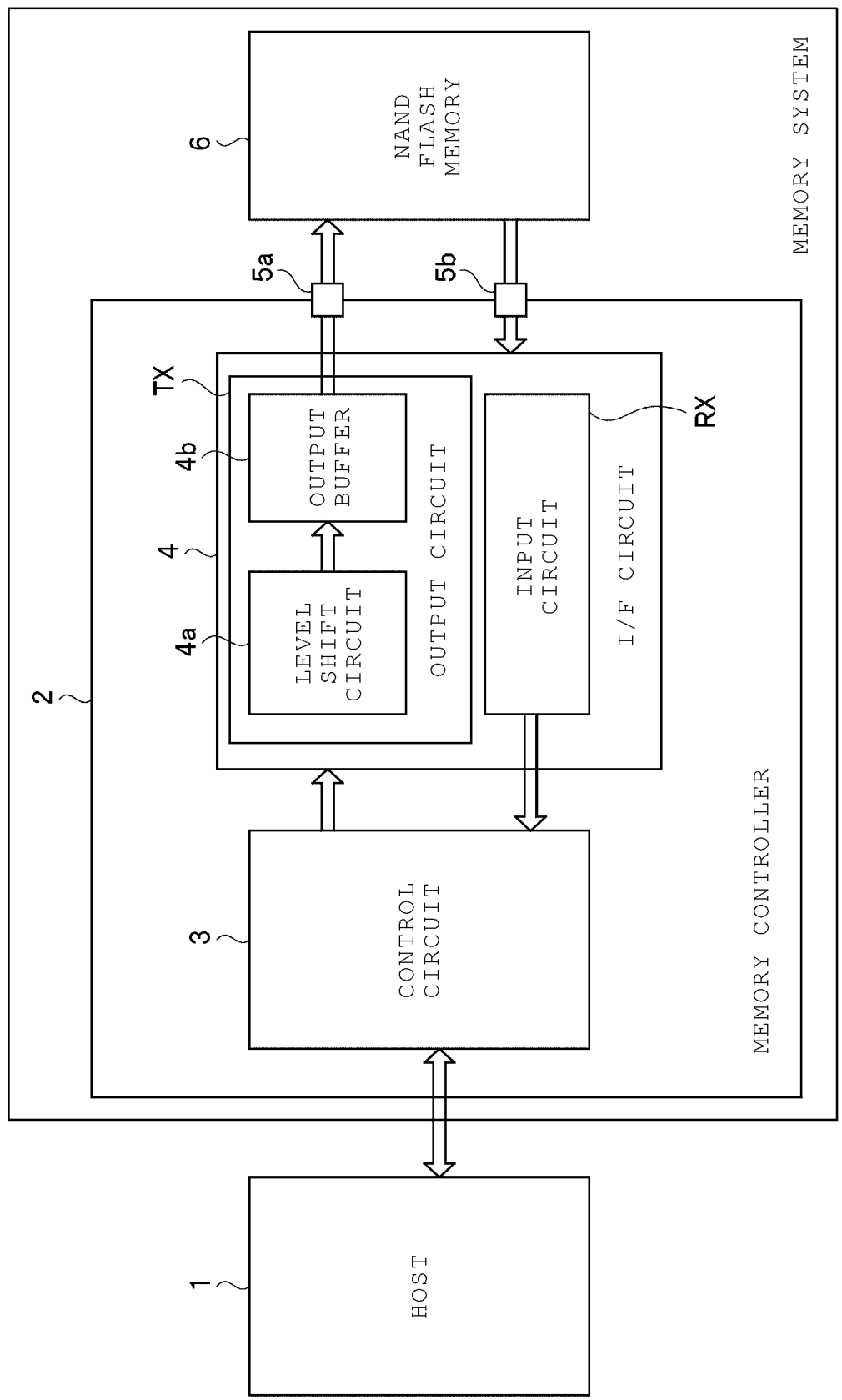
FIG. 1 is a block diagram illustrating a storage system including a memory system including a semiconductor integrated circuit according to a first embodiment.

FIG. 1 is a block diagram illustrating a storage system including a memory system including a semiconductor integrated circuit according to a first embodiment. The semiconductor integrated circuit according to the present embodiment is provided in a level shift circuit that generates an output signal by shifting (that is, changing) a level of an input signal. The semiconductor integrated circuit according to the present embodiment includes a variable resistance switch circuit, and changes a resistance value of the variable resistance switch circuit depending on whether the level shift circuit is in operation, not in operation, or the like. Thereby, the semiconductor integrated circuit according to the present embodiment is capable of reducing ISI and power consumption of the level shift circuit.

In the storage system of FIG. 1, a host 1 and a memory controller 2 of a memory system are connected to each other via a predetermined interface. For example, as the interface, interface standards such as an embedded multimedia card (eMMC), which is an example of a parallel interface, a Peripheral Component Interconnect-express® (PCIe), which is an example of a serial interface, and M-PHY are employed. In the host 1 and the memory controller 2, interface circuits that conform to such interface standards are included.

The memory system includes the memory controller 2 and a NAND flash memory 6 (hereinafter simply referred to as a flash memory 6). The memory controller 2 and the flash memory 6 are examples of semiconductor devices. The memory controller 2 includes a control circuit 3 and an interface (I/F) circuit 4. The I/F circuit 4 is an example of an interface device. The control circuit 3 controls the overall operation of the memory controller 2. For example, the control circuit 3 executes processing for commanding the flash memory 6 to execute writing, reading, erasure, and the like in response to commands from the host 1. The control circuit 3 manages a memory space of the flash memory 6. The flash memory 6 includes a storage medium in which data received from the memory controller 2 are stored.

The control circuit 3 generates commands, addresses, and data (hereinafter referred to as data) in response to commands from the host 1. The data is supplied to the flash memory 6 via the I/F circuit 4. The control circuit 3 supplies synchronization signals to the flash memory 6 via the I/F circuit 4.

That is, the data and the synchronization signals transmitted between the memory controller 2 and the flash memory 6 are transmitted via the I/F circuit 4. The I/F circuit 4 adopts, for example, a high-speed data transfer mode such as a toggle double data rate (ToggleDDR) or an interface standard such as an open NAND flash interface (ONFI). The I/F circuit 4 transfers data and the like to the flash memory 6 based on such interface standards.

The I/F circuit 4 transmits, for example, a plurality of signals for transmitting and receiving various information including data. The plurality of signals include a data signal DQ<7:0>, data strobe signals DQS, /DQS, a chip enable signal CE, a command latch enable signal CLE, an address latch enable signal ALE, a write enable signal /WE, read enable signals RE, /RE, a write protect signal WP, and the like.

The I/F circuit 4 includes an output circuit TX including a level shift circuit 4a and an output buffer 4b. The level shift circuit 4a receives a signal supplied from the control circuit 3 and processed by an internal circuit of the I/F circuit 4. The level shift circuit 4a shifts (that is, changes) a voltage level of the received signal to a higher voltage level and outputs the changed signal to the output buffer 4b. The output buffer 4b buffers the signal received from the level shift circuit 4a and outputs the buffered signal to the flash memory 6 via an output terminal 5a. The input circuit RX supplies a signal received from the flash memory 6 to the internal circuit of the I/F circuit 4. The signal processed by the internal circuit is output to the control circuit 3.

An I/F circuit including a level shift circuit having the same configuration as the level shift circuit 4a according to the present embodiment may be employed for signal transmission between the host 1 and the memory controller 2. An I/F circuit including a level shift circuit having the same configuration as the level shift circuit 4a may be included not only in the memory controller 2 but also in the host 1 and the flash memory 6, and the I/F circuit 4 may be configured as a chip which is independent of the host 1, the memory controller 2, and the flash memory 6.

In FIG. 1, an example in which the level shift circuit 4a according to the present embodiment is included in the I/F circuit 4 between the flash memory 6 and the memory controller 2 is described, but the level shift circuit 4a may be included in various interface circuits provided in a device different from the memory system.

Comparative Example 1

Figure 2:
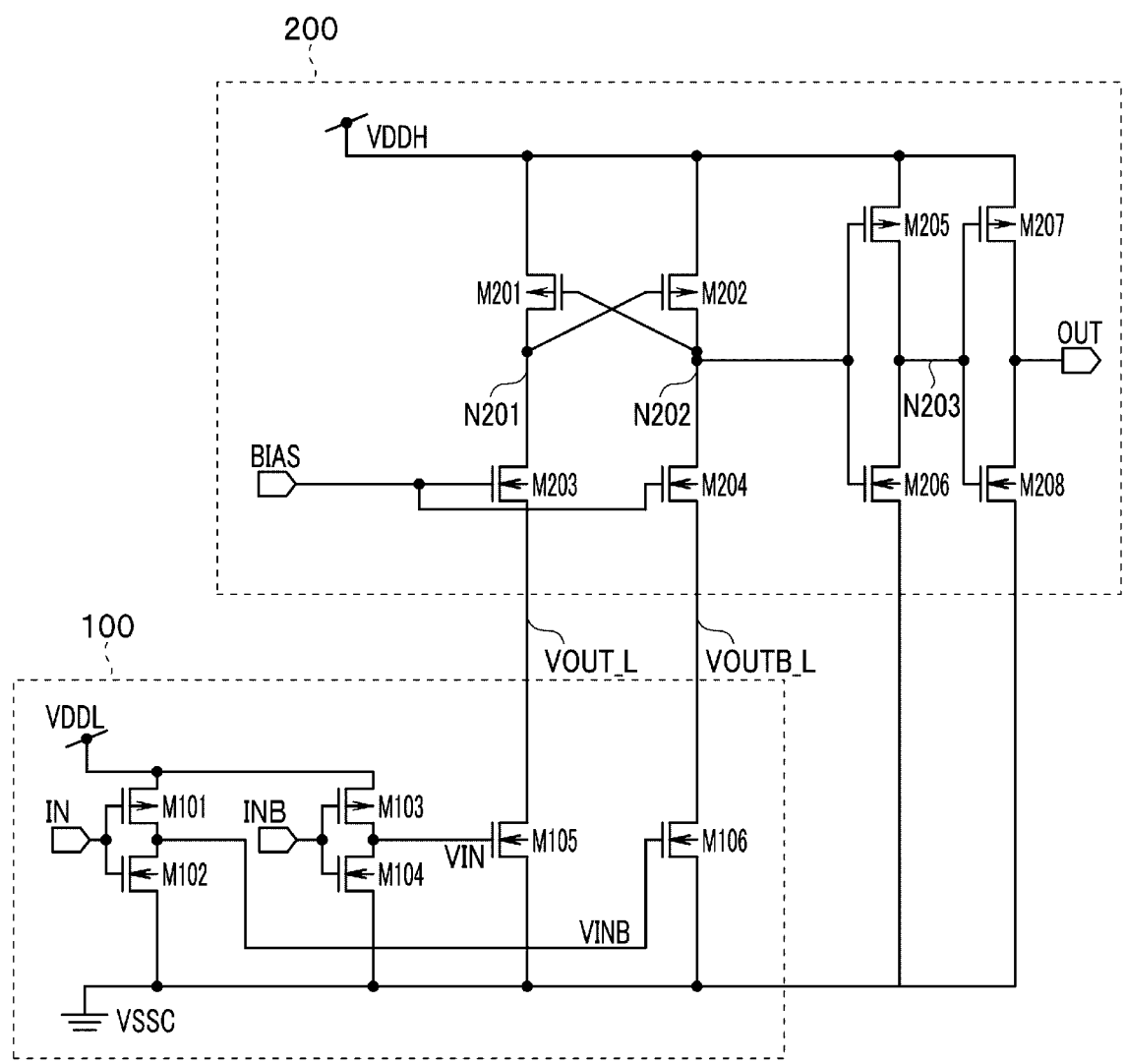
FIG. 2 is a circuit diagram of a level shift circuit according to a first comparative example.

FIG. 2 is a circuit diagram illustrating a level shift circuit according to Comparative Example 1. Comparative Example 1 of the level shift circuit will be described with reference to FIG. 2.

The level shift circuit in FIG. 2 includes a low voltage circuit portion 100 and a high voltage circuit portion 200. Input signals IN and INB, which are differential pulse signals, are input to the low voltage circuit portion 100. That is, the input signals IN and INB are inverted signals of each other. The input signals IN and INB are both low voltage amplitude signals. The low voltage circuit portion 100 outputs differential signals VOUT_L and VOUTB_L based on the input signals IN and INB. The high voltage circuit portion 200 outputs an output signal OUT based on the differential signals VOUT_L and VOUTB_L. The output signal OUT is a single-phase pulse signal and is a high voltage amplitude signal. The low voltage circuit portion 100 includes a thin film transistor with a low threshold voltage which operates at a low voltage VDDL, and the high voltage circuit portion 200 includes a thick film transistor with a high threshold voltage which operates at a high voltage VDDH. That is, the high voltage circuit portion 200 can process a signal with a higher voltage amplitude than that of the low voltage circuit portion 100.

The low voltage circuit portion 100 includes an inverter including a PMOS transistor M101 and an NMOS transistor M102, and an inverter including a PMOS transistor M103 and an NMOS transistor M104. The transistor M101 has a source connected to a wiring (hereinafter referred to as a low voltage wiring) VDDL connected to a low voltage power supply that supplies the low voltage VDDL, and a drain connected to a drain of the transistor M102. A source of the transistor M102 is connected to a reference voltage VSSC to which a voltage VSSC is supplied. The transistor M103 has a source connected to the low voltage wiring VDDL and a drain connected to a drain of the transistor M104. A source of the transistor M104 is connected to the reference voltage VSSC.

The input signal IN is supplied to gates of the transistors M101 and M102, and the input signal INB is supplied to gates of the transistors M103 and M104. The input signal IN is inverted by the inverter including the transistors M101 and M102. A signal VINB, which is the inverted signal of the input signal IN, appears at a connection point (hereinafter referred to as a node VINB) between the drain of the transistor M101 and the drain of the transistor M102. The input signal INB is inverted by the inverter including the transistors M103 and M104. A signal VIN, which is the inverted signal of the input signal INB, appears at a connection point (hereafter referred to as a node VIN) between the drain of the transistor M103 and the drain of the transistor M104.

The signal VIN is supplied to a gate of an NMOS transistor M105, and the signal VINB is supplied to a gate of an NMOS transistor M106. Sources of the transistors M105 and M106 are connected to the reference voltage VSSC, and drains thereof are connected to the high voltage circuit portion 200. The transistors M105 and M106 are turned on/off based on the signals VIN and VINB, generate the differential signals VOUT_L and VOUTB_L based on the input signals IN and INB at the drains, and output the generated signals to the high voltage circuit portion 200. Nodes connected to the drains of the transistors M105 and M106 are respectively referred to as a node VOUT_L and a node VOUTB_L.

The high voltage circuit portion 200 includes a cross-coupled circuit including PMOS transistors M201 and M202. The transistor M201 has a source connected to a wiring (hereinafter referred to as a high voltage wiring) VDDH connected to a high voltage power supply that supplies the high voltage VDDH, and a drain connected to the drain of the transistor M105 via a drain-source path of a transistor M203. That is, the transistor M203 forms a stack together with the transistor M105. The transistor M202 has a source connected to the high voltage wiring VDDH and a drain connected to the drain of the transistor M106 via a drain-source path of a transistor M204. That is, the transistor M204 forms a stack together with the transistor M106. The gate of the transistor M201 is connected to the drain of the transistor M202, and the gate of the transistor M202 is connected to the drain of the transistor M201. A signal BIAS is supplied to the gates of the transistors M203 and M204.

A node connected to the drain of the transistor M201 is a node N201, and a node connected to the drain of the transistor M202 is a node N202. The node N202 is connected to gates of a PMOS transistor M205 and an NMOS transistor M206 that form an inverter. The transistor M205 has a source connected to the high voltage wiring VDDH and a drain connected to a drain of the transistor M206. A source of the transistor M206 is connected to the reference voltage VSSC. Both drains of the transistors M205 and M206 are connected to both gates of a PMOS transistor M207 and an NMOS transistor M208 that form an inverter. That is, the drains of the transistors M205 and M206 are connected to the gates of the PMOS transistor M207 and the NMOS transistor M208. The transistor M207 has a source connected to the high voltage wiring VDDH and a drain connected to a drain of the transistor M208. A source of the transistor M208 is connected to the reference voltage VSSC. The drains of the transistors M207 and M208 are connected to an output terminal OUT.

Here, it is assumed that the input signal IN is at a low level (hereinafter referred to as an L level) and the input signal INB is at a high level (hereinafter referred to as an H level). The transistor M105 is turned off and the transistor M106 is turned on according to the levels of the input signals IN and INB. Here, the transistor M202 is turned off, the transistor M201 is turned on, the node N202 is at an L level, and the L-level output signal OUT is output to the output terminal OUT.

From here, when the input signal IN changes to an H level (the input signal INB changes to an L level), the transistor M105 is turned on, and the transistor M106 is gradually switched from an on state to an off state. Here, the drain of the transistor M201 (node N201) is set to be at an L level, and the drain of the transistor M202 (node N202) changes from an L level to an H level. That is, an H level is applied to the gate of the transistor M201, and an L level is applied to the gate of the transistor M202, such that the transistor M201 is turned off and the transistor M202 is turned on. A voltage appearing in the drain of the transistor M202 (node N202) gradually rises. That is, the cross-coupled circuit operates by positive feedback with changes in the differential input signals IN and INB as triggers, thereby raising the output signal OUT to the high voltage VDDH.

Thereafter, when the input signal INB is set to be at an H level and the input signal IN is set to be at an L level, the transistor M105 is turned off and the transistor M106 is turned on. Here, the transistor M202 is turned off by the cross-coupled circuit of the transistors M201 and M202, and the output terminal OUT is maintained at an L level.

The high voltage circuit portion 200 is provided with the transistors M203 and M204 functioning as protective transistors. The protective transistor is provided between the terminals of the thin film transistor provided in the low voltage circuit portion 100 to prevent the thin film transistor from being destroyed due to the application of a voltage exceeding a breakdown voltage value thereof. The transistors M203 and M204, which are NMOS thick film transistors, receive a signal BIAS at a stationary level of an intermediate voltage between the low voltage VDDL and the high voltage VDDH by the gates and operate in a half-on state at all times. The half-on state indicates a state where the transistor operates in a linear region in which a drain current linearly increases with respect to a drain-source voltage Vds. That is, on-resistances of the transistors M203 and M204 have a value corresponding to the level of the signal BIAS.

That is, the on-resistances of the transistors M203 and M204 in a half-on state are higher than those in a turn-on state. Resistance voltage division of a voltage between the high voltage VDDH and the reference voltage VSSC is performed by the transistors M203 and M204, and thus the voltages of the nodes VOUT_L and VOUTB_L are determined. The signal BIAS is set to a value that prevents the voltages of VOUT_L and VOUTB_L from breaking the breakdown voltages of the transistors M105 and M106, that is, to a value that does not exceed the breakdown voltage value.

Figure 3:
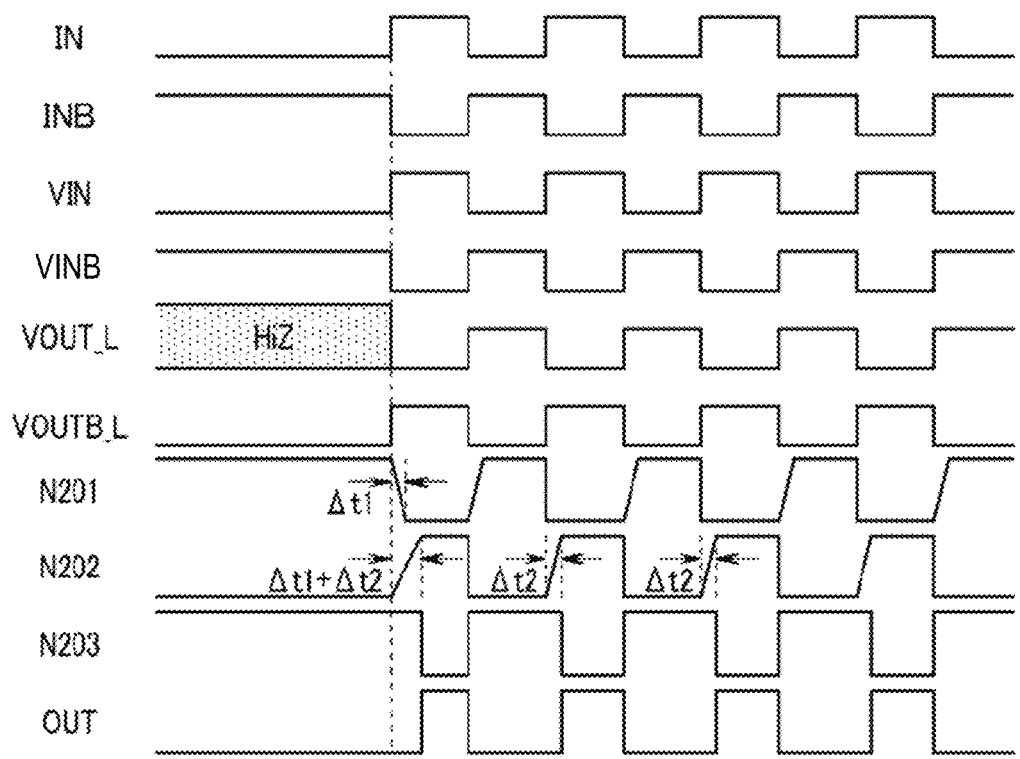
FIG. 3 is a timing chart showing waveforms of signals and nodes in the first comparative example.

FIG. 3 is a timing chart showing waveforms of signals and nodes in Comparative Example 1. FIG. 3 shows waveforms of the input signals IN and INB, the signals VIN and VINB, the nodes VOUT_L and VOUTB_L, and the nodes N201, N202, and N203 in FIG. 2, and a waveform of the output signal OUT. FIG. 3 shows waveforms from a shutdown state before the level shift circuit operates to a state where the level shift circuit is set to be in an operation state by the input signals IN and INB input thereto.

The level shift circuit in Comparative Example 1 illustrated in FIG. 2 has a problem in that the node VOUT_L or VOUTB_L is set to be in a HiZ (high impedance) state when power is shut down, causing ISI in an output signal and degrading the waveform quality.

It is assumed that the input signal IN is at an L level (the input signal INB is at an H level) in the initial state when power is shut down. Here, the signal VIN is at an L level and the signal VINB is at an H level. Here, the transistor M106 is turned on and the transistor M105 is turned off. Since the transistor M106 is turned on, the node VOUTB_L has a value near an L level. On the other hand, since the transistor M105 is turned off, the node VOUT_L becomes HiZ (high impedance). HiZ means that the voltage of a node is indefinite and can take various positive and negative values. FIG. 3 illustrates an example in which the node VOUT_L is set to HiZ which is a relatively high voltage in the initial state of the input signal IN (hereinafter simply referred to as an initial state) when power is shut down. In the initial state, the node VOUTB_L has a voltage near an L level, and thus the output terminal OUT is at an L level.

Next, it is assumed that the input signal IN has a value different from the initial state by the supply of power, and a period in which the level shift circuit operates (hereinafter referred to as an operation period) is set. For example, it is assumed that the input signal IN transitions from an L level in the initial state to an H level (the input signal INB transitions to an L level). Signals VIN and VINB, which are inverted signals of the input signals IN and INB, appear at the gates of the transistors M105 and M106, respectively. Thereby, the transistor M105 switches from an off state to an on state, and the transistor M106 switches from an on state to an off state.

The transistor M203 is provided between the node N201 and the transistor M105. The transistor M204 is provided between the node N202 and the transistor M106. The levels of the nodes N201 and N202 transition after a predetermined delay time from the on/off switching of the transistors M105 and M106. Since the transistor M105 is turned on (the node VOUT_L has a value near an L level), the node N201 begins transitioning to an L level. Thereby, the transistor M202 is turned on to cause the node N202 to transition to an H level. As a result, the transistor M201 is turned off, and an L level of the node N201 is maintained.

However, since VOUT_L is HiZ in the initial state, a period of time required for the node N201 to be set to be at an L level is longer by Δt1 than a period of time required for the node VOUTB_L to transition from an L level to an H level. That is, when the level shift circuit in Comparative Example 1 illustrated in FIG. 2 is started up, delay times of the differential signals VOUT_L and VOUTB_L input to the high voltage circuit portion 200 vary, and a falling time for which the voltage of the node N201 transitions from an H level to an L level is delayed by Δt1, as illustrated in FIG. 3. The delay time Δt1 propagates, thereby degrading the waveform quality of the output signal OUT.

In the level shift circuit in Comparative Example 1 illustrated in FIG. 2, the turn-on time of the thick film transistor M202 is slower than the turn-on time of the thin film transistor M106 due to the influence of a difference in threshold voltage between the thick film transistor and the thin film transistor. Thus, in the node N202, a rising time for which the voltage transitions from an L level to an H level is slower than the falling time, and the node N201 is delayed by Δt2 after transitioning to an L level and is set to be at an H level. The delay time Δt2 propagates, which leads to a problem that a duty cycle (duty ratio) of the output signal OUT deteriorates.

Comparative Example 2

Figure 4:
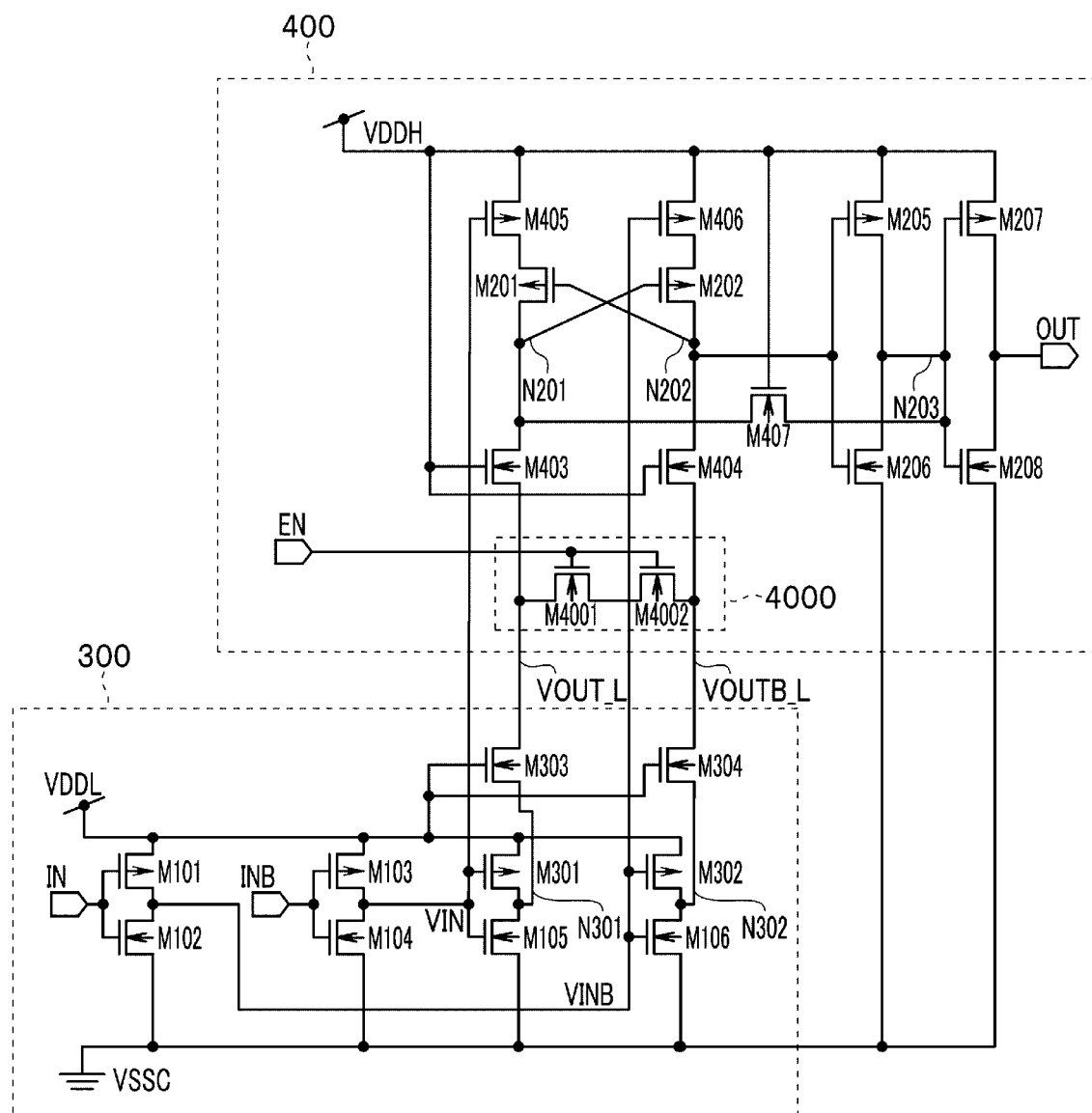
FIG. 4 is a circuit diagram of a level shift circuit according to a second comparative example.

Consequently, Comparative Example 2 of a level shift circuit for solving the problem in Comparative Example 1 has been proposed. FIG. 4 is a circuit diagram illustrating a level shift circuit according to Comparative Example 2. In FIG. 4, the same components as those in FIG. 2 are denoted by the same reference numerals, and the description thereof is omitted.

A low voltage circuit portion 300 is different from the low voltage circuit portion 100 in Comparative Example 1 in that transistors M301 and M302, which are thin film PMOS transistors with a low threshold voltage, and transistors M303 and M304, which are thin film NMOS transistors with a low threshold voltage, are added. The transistor M301 has a source connected to the low voltage wiring VDDL, a drain connected to the drain of the transistor M105, and a gate to which the signal VIN is supplied. The transistor M302 has a source connected to the low voltage wiring VDDL, a drain connected to the drain of the transistor M106, and a gate to which the signal VINB is supplied.

An inverter is configured with the transistors M301 and M105, and the drains of the transistors M301 and M105 (hereinafter referred to as a node N301) are connected to the node VOUT_L through a current path of the transistor M303. The transistor M303 has a drain connected to the node VOUT_L, a source connected to the node N301, and a gate connected to the low voltage wiring VDDL.

An inverter is configured with the transistors M302 and M106, and the drains of the transistors M302 and M106 (hereinafter referred to as a node N302) are connected to the node VOUTB_L via a current path of the transistor M304. The transistor M304 has a drain connected to the node VOUTB_L, a source connected to the node N302, and a gate connected to the low voltage wiring VDDL.

The transistors M301 and M302 have a function of respectively lowering the nodes N301 and N302 to the low voltage VDDL. Thereby, it is possible to prevent breakdown voltage violation of the thin film transistors M105 and M106. The transistors M303 and M304 are turned on at all times when the level shift circuit is operating and are turned off when the low voltage power supply supplying the low voltage VDDL is turned off. Therefore, a through current is prevented from flowing from the nodes VOUT_L and VOUTB_L to the reference voltage VSSC when the low voltage power supply supplying the low voltage VDDL is turned off.

A high voltage circuit portion 400 is different from the high voltage circuit portion 200 in Comparative Example 1 in that a resistive switch circuit 4000 including transistors M4001 and M4002, which are thick film NMOS transistors with a high threshold voltage, transistors M403, M404, and M407, which are thick film NMOS transistors with a high threshold voltage, and transistors M405 and M406, which are thick film PMOS transistors with a high threshold voltage, are added. The transistor M403 has a drain connected to the node N201, a source connected to the node VOUT_L, and a gate connected to the high voltage wiring VDDH. The transistor M404 has a drain connected to the node N202, a source connected to the node VOUTB_L, and a gate connected to the high voltage wiring VDDH. The transistors M403 and M404 are turned on at all times when the level shift circuit is operating, and are turned off when the high voltage power supply supplying the high voltage VDDH is turned off. Therefore, a through current is prevented from flowing from the high voltage wiring VDDH to the nodes VOUT_L and VOUTB_L when the high voltage power supply supplying the high voltage VDDH is turned off.

The transistor M405 has a source connected to the high voltage wiring VDDH, a drain connected to the source of the transistor M201, and a gate to which the signal VIN is supplied. The transistor M406 has a source connected to the high voltage wiring VDDH, a drain connected to the source of the transistor M202, and a gate to which the signal VINB is supplied. The transistors M405 and M406 have a function of shortening rising times of the transistors M201 and M202 configuring the cross-coupled circuit.

In Comparative Example 2, current paths of the transistors M4001 and M4002 are connected between the node VOUT_L and the node VOUTB_L. One end of a source-drain path of the transistor M4001 is connected to the node VOUT_L, and the other end is connected to one end of a source-drain path of the transistor M4002. The other end of the source-drain path of the transistor M4002 is connected to the node VOUTB_L. An enable signal EN is supplied to the gates of the transistors M4001 and M4002. When the H-level enable signal EN is supplied to the gates of the transistors M4001 and M4002, electrical conduction is allowed between the transistors M4001 and M4002 to short-circuit the nodes VOUT_L and VOUTB_L.

The enable signal EN is a signal for starting up the level shift circuit and is supplied from the control circuit 3, for example. By using the enable signal EN to control the transistors M4001 and M4002, it is possible to omit a special circuit for generating the enable signal EN. The enable signal EN maintains an H level at all times after the level shift circuit is started up. Even here, the resistances of the transistors M4001 and M4002 change the levels of the nodes VOUT_L and VOUTB_L according to the levels of the input signals IN and INB.

In Comparative Example 2, a current path of the transistor M407 is provided between the node N201 and the node N203. In the transistor M407, one end of a source-drain path is connected to the node N201, the other end is connected to the node N203, and a gate is connected to the high voltage wiring VDDH. The transistor M407 is turned on at all times while the high voltage power supply providing the high voltage VDDH is turned on. Thereby, the transistor M407 changes the voltage of the node N203 to an L level when the node N201 transitions from an H level to an L level.

Figure 5:
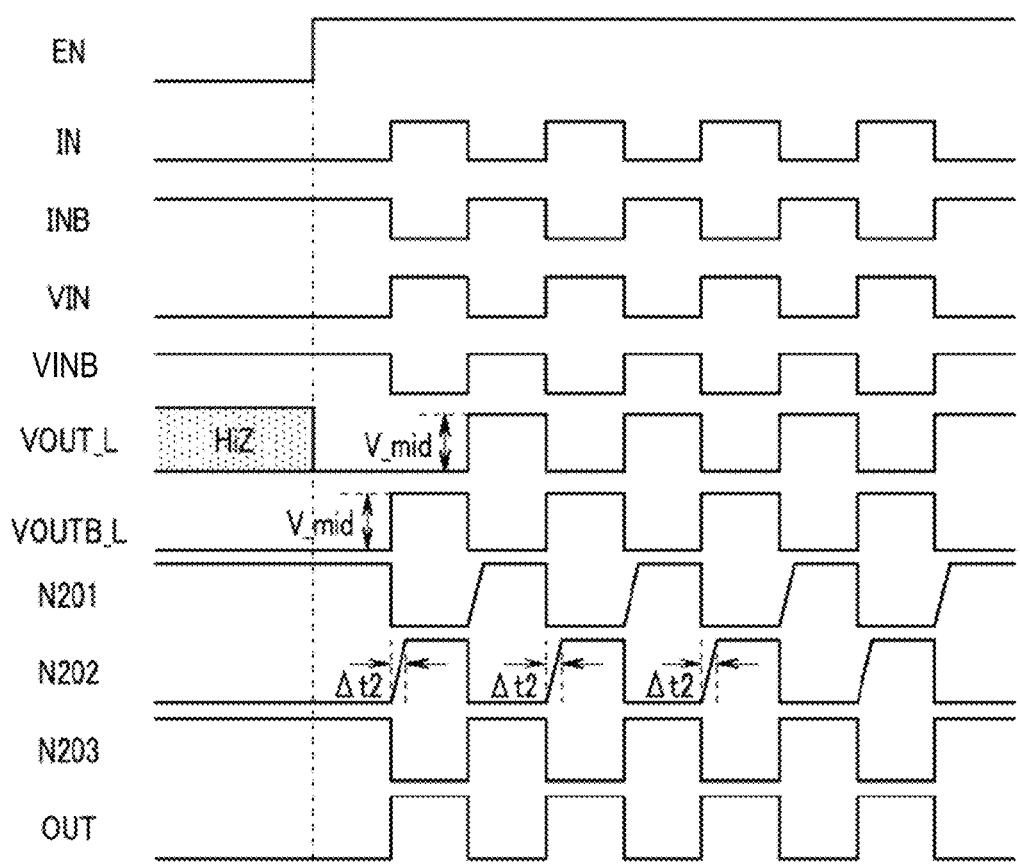
FIG. 5 is a timing chart showing waveforms of signals and nodes in the second comparative example.

FIG. 5 is a timing chart showing waveforms of signals and nodes in Comparative Example 2. FIG. 5 illustrates waveforms of the enable signal EN, the input signals IN and INB, the signals VIN and VINB, the nodes VOUT_L and VOUTB_L, the nodes N201, N202, and N203, and the waveform of the output signal OUT. FIG. 5 illustrates waveforms from a shutdown state before the level shift circuit operates to a state where the level shift circuit is started up in response to the enable signal EN, the operation period is set by the input of the input signals IN and INB, and the level shift circuit enters an operation state.

The low voltage circuit portion 300 outputs the differential signals VOUT_L and VOUTB_L to the nodes VOUT_L and VOUTB_L based on the input signals IN and INB with a low voltage amplitude. The high voltage circuit portion 400 operates the cross-coupled circuit by positive feedback based on the differential signals VOUT_L and VOUTB_L to generate signals corresponding to the input signals IN and INB at the nodes N201 and N202. A signal appearing in the node N202 is output from the output terminal OUT through a two-stage inverter configured with the transistors N205 to N208.

As illustrated in FIG. 5, VOUT_L is in an HiZ state in the initial state. In Comparative Example 2, the enable signal EN changes from an L level to an H level in the initial state. When the enable signal EN is set to be at an H level, the transistors M4001 and M4002 configuring the resistive switch circuit 4000 are turned on, thereby generating a short-circuit path between the node VOUT_L and the node VOUTB_L. As a result, the voltage of the node VOUT_L matches the voltage (VSSC) of the node VOUTB_L. Thereby, the delay Δt1 in the falling time (see FIG. 3) of the node N201 is eliminated when the input signal IN transitions from an L level to an H level. Thereby, Comparative Example 2 has an effect of reducing ISI of the output signal.

Also in Comparative Example 2, the turn-on time of the thick film transistor M202 is slower than the turn-on time of the thin film transistor M106. Thus, a rising time for which the voltage of the node N202 transitions from an L level to an H level is slower than the falling time, and the rising time is delayed by Δt2 after the node N201 transitions to an L level, thereby changing the voltage of the node N202 to an H level. However, in Comparative Example 2, an L level of the node N201 is transmitted to the node N203 by the transistor M407 during the falling of the node N201. As a result, the node N203 transitions to an L level together with the fall of the node N201. As such, in Comparative Example 2, the influence of the delay Δt2 in the rising time of the node N202 on the output signal OUT is eliminated, which leads to an effect of improving the duty cycle.

However, in the level shift circuit in Comparative Example 2 illustrated in FIG. 5, the resistive switch circuit 4000 is employed to make the node VOUT_L match the level of the node VOUT_L in the initial state, and a through current flows from the high voltage wiring VDDH to the low voltage wiring VDDL when the level shift circuit operates, resulting in a problem of large current consumption.

A through current flows from the high voltage wiring VDDH to the low voltage wiring VDDL during the operation of the level shift circuit by the transistors M301 and M302 for preventing breakdown voltage violation of the transistors M105 and M106. The through current has a disadvantage of increasing power consumption. When a voltage between the high voltage VDDH and the low voltage VDDL is V_mid, the nodes VOUT_L, VOUTB_L, N301, and N302 operate in a voltage range from 0 to V_mid. That is, a voltage between the source and the drain of the transistors M105 and M106 reaches V_mid at the maximum, and there is a possibility that breakdown voltage violation will occur, thereby resulting in a decrease in reliability.

Configuration of First Embodiment

Consequently, in the present embodiment, a resistive switch circuit with a variable resistance value is employed between the nodes VOUT_L and VOUTB_L. Thereby, it is possible to eliminate Δt1 and improve the waveform quality of the output signal OUT.

Figure 6:
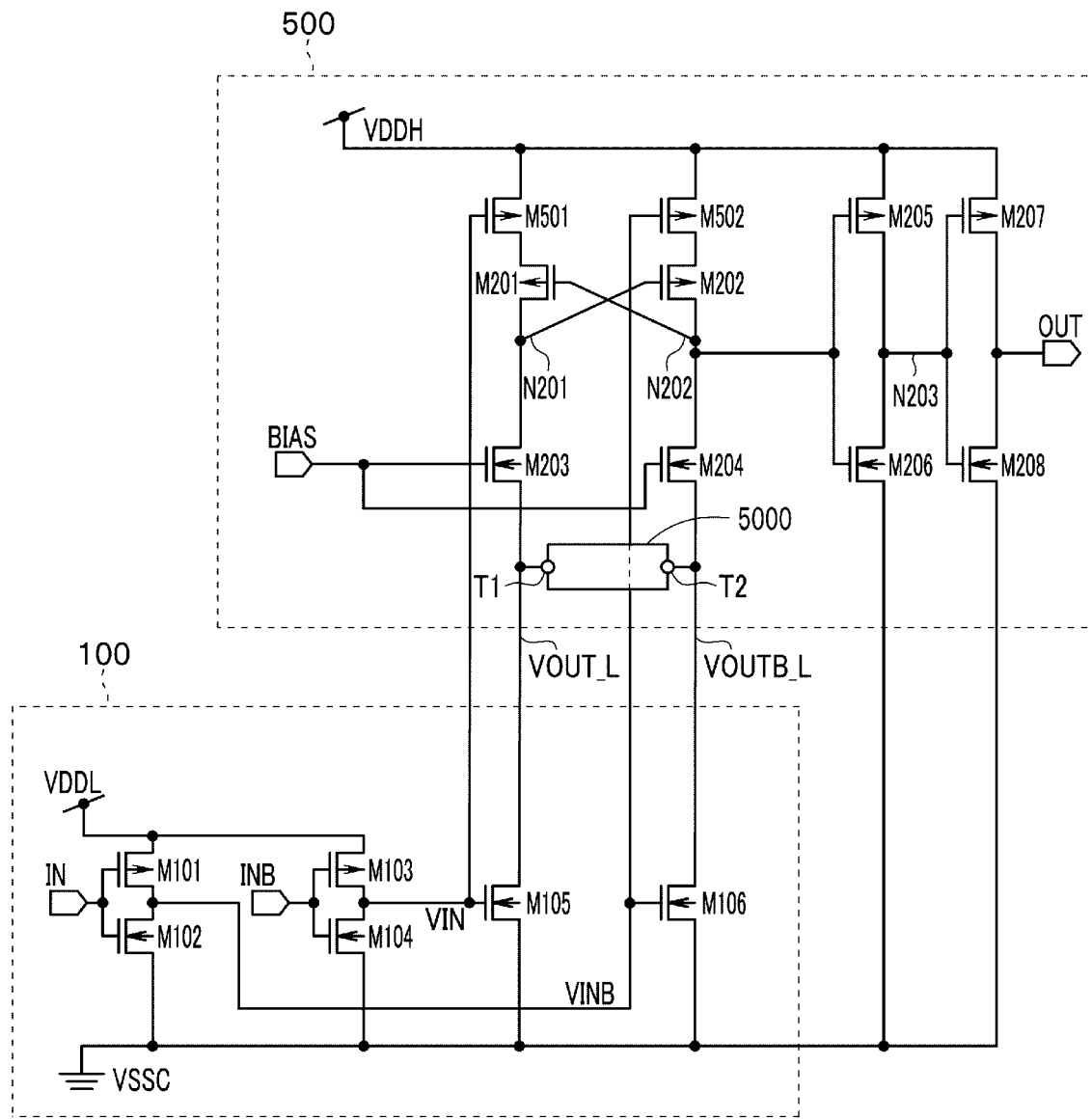
FIG. 6 is a circuit diagram illustrating a level shift circuit including the semiconductor integrated circuit according to the first embodiment.

FIG. 6 is a circuit diagram illustrating the semiconductor integrated circuit according to the first embodiment. FIG. 6 illustrates the semiconductor integrated circuit that can be employed for the level shift circuit 4a in FIG. 1. In FIG. 6, the same components as those in FIG. 2 are denoted by the same reference numerals, and repeated descriptions of the same configurations are omitted.

The semiconductor integrated circuit according to the first embodiment is different from the level shift circuit in Comparative Example 1 of FIG. 2 in that a high voltage circuit portion 500 is employed instead of the high voltage circuit portion 200. The high voltage circuit portion 500 includes a thick film transistor with a high threshold voltage. The high voltage circuit portion 500 is different from the high voltage circuit portion 200 in FIG. 2 in that a variable resistance switch circuit 5000 and transistors M501 and M502, which are thick film PMOS transistors with a high threshold voltage, are added.

A current path of the transistor M501 is connected between the source of the transistor M201 and the high voltage wiring VDDH, and a current path of the transistor M502 is connected between the source of the transistor M202 and the high voltage wiring VDDH. That is, the transistor M501 has a source connected to the high voltage wiring VDDH, a drain connected to the drain of the transistor M201, and a gate to which the signal VIN is supplied. The transistor M502 has a source connected to the high voltage wiring VDDH, a drain connected to the drain of the transistor M202, and a gate to which the signal VINB is supplied. The transistor M501 is turned on by the L-level signal VIN, and the transistor M502 is turned on by the L-level signal VINB. The transistors M501 and M502 contribute to reducing rising times of the transistors M201 and M202.

The variable resistance switch circuit 5000 includes terminals T1 and T2 and is configured such that the terminal T1 is connected to the node VOUT_L and the terminal T2 is connected to the node VOUTB_L to control electrical conduction between the nodes VOUT_L and VOUTB_L.

Figure 7:
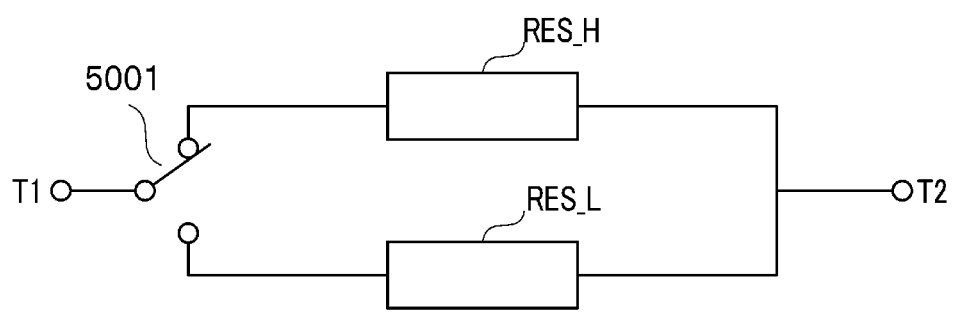
FIG. 7 is a block diagram illustrating an example of a circuit configuration of a variable resistance switch circuit.

FIG. 7 is a block diagram illustrating an example of a circuit configuration of the variable resistance switch circuit 5000 in FIG. 6. The terminal T1 is connected to the node VOUT_L, and the terminal T2 is connected to the node VOUTB_L. A switch 5001 and resistance circuits RES_H and RES_L are provided between the terminal T1 and the terminal T2. The switch 5001 switches whether to connect the high resistance circuit RES_H or the low resistance circuit RES_L between the terminals T1 and T2. The high resistance circuit RES_H has a relatively high resistance value, and the low resistance circuit RES_L has a relatively low resistance value. That is, the resistance value of the high resistance circuit RES_H is greater than the resistance value of the low resistance circuit RES_L. The switch 5001 is configured with, for example, a multiplexer or a plurality of transistors.

The switch 5001 selects the low resistance circuit RES_L in the initial state to reduce a resistance value between the terminals T1 and T2. The switch 5001 selects the high resistance circuit RES_H in the operation state of the level shift circuit to increase a resistance value between the terminals T1 and T2. Thereby, the variable resistance switch circuit 5000 matches the voltages of the node VOUT_L and the node VOUTB_L in the initial state. The variable resistance switch circuit 5000 reduces power consumption in the operation state of the level shift circuit by making it difficult for a through current to flow between the node VOUT_L and the node VOUTB_L.

Figure 8:
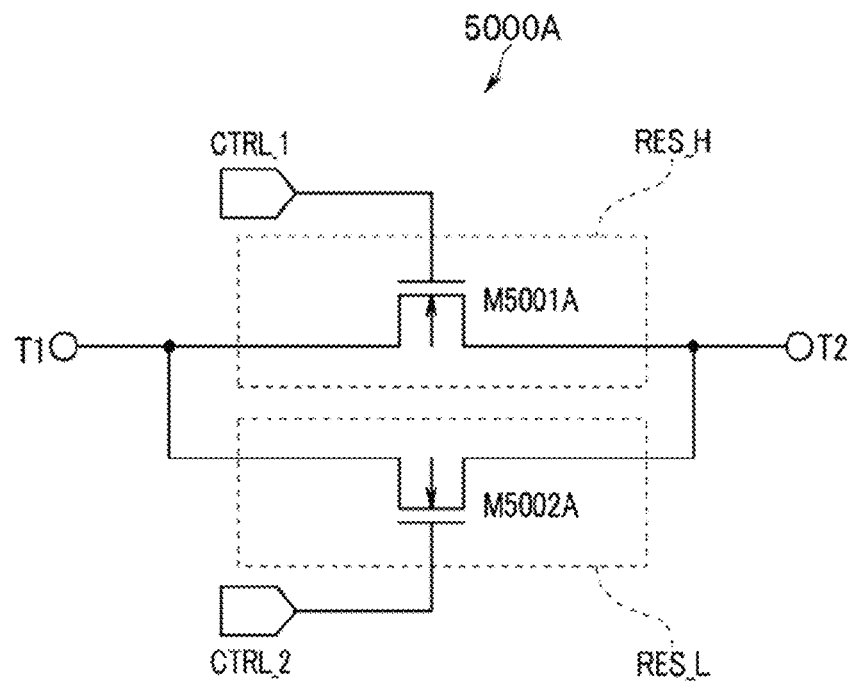
FIG. 8 is a circuit diagram illustrating another example of the variable resistance switch circuit.

FIG. 8 is a circuit diagram illustrating a variable resistance switch circuit 5000A which is another example of the variable resistance switch circuit 5000. The variable resistance switch circuit 5000A is obtained by configuring the variable resistance switch circuit 5000 with a circuit including a transistor. The variable resistance switch circuit 5000A is an example in which the high resistance circuit RES_H is configured with a transistor M5001A, which is a thick film NMOS transistor, and the low resistance circuit RES_L is configured with a transistor M5002A, which is a thick film NMOS transistor.

A current path of the transistor M5001A and a current path of the transistor M5002A are connected in parallel between the terminal T1 and the terminal T2. In the transistor M5001A, one end of a drain-source path is connected to the terminal T1, the other end is connected to the terminal T2, and a control signal CTRL_1 is supplied to a gate. In the transistor M5002A, one end of a drain-source path is connected to the terminal T1, the other end is connected to the terminal T2, and a control signal CTRL_2 is supplied to a gate. An on-resistance of the transistor M5001A is relatively high, and an on-resistance of the transistor M5002A is relatively low. That is, the on-resistance of the transistor M5001A is higher than that of the transistor M5002A.

The high resistance circuit RES_H may be a circuit in which two or more transistors M5001A, which are thick film NMOS transistors, are connected in series, and the low resistance circuit RES_L may be a circuit in which two or more transistors M5002A, which are thick film NMOS transistors, are connected in series. The resistance value of the high resistance circuit RES_H is adjusted to a relatively high value by increasing the channel length of the transistor M5001A, increasing the number of series connections, or decreasing the voltage of the control signal CTRL_1. Similarly, the resistance value of the low resistance circuit RES_L is adjusted to a relatively low value by shortening the channel length of the transistor M5002A, reducing the number of series connections, or increasing the voltage of the control signal CTRL_1.

Figure 9:
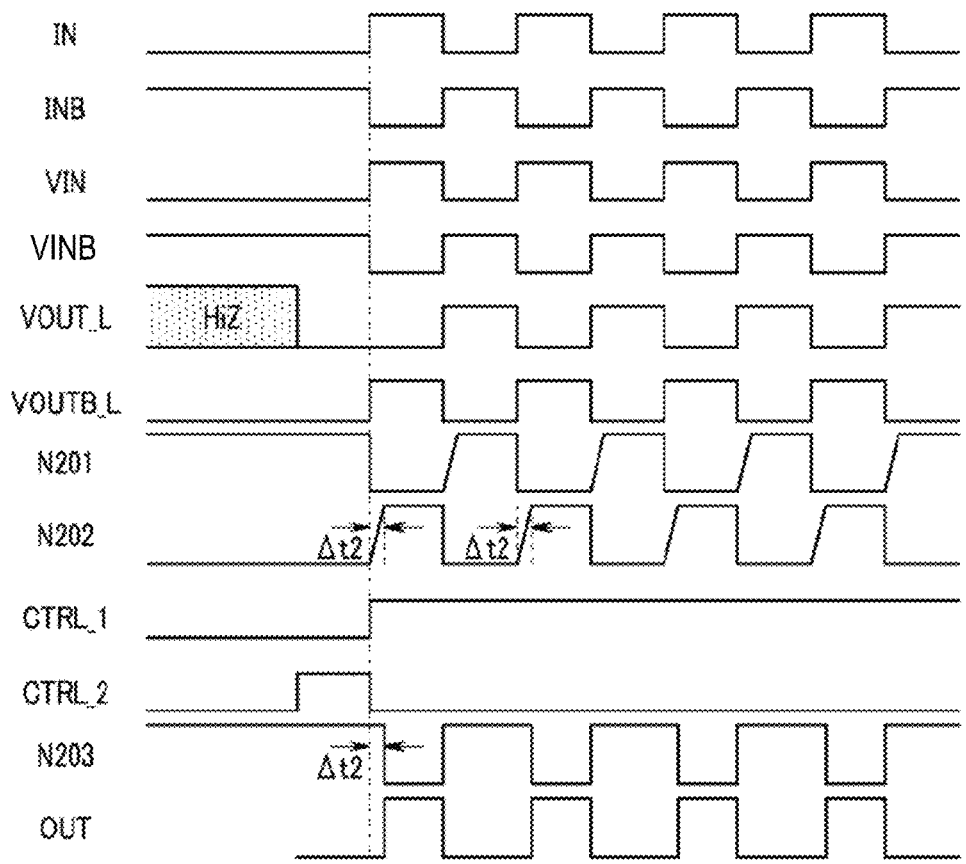
FIG. 9 is a timing chart showing operations of the level shift circuit of the first embodiment.

Next, operations in the embodiment configured as such will be described with reference to a timing chart of FIG. 9. FIG. 9 illustrates waveforms of the input signals IN and INB, the signals VIN and VINB, the nodes VOUT_L and VOUTB_L, and the nodes N201 and N202, a waveform of the control signals CTRL_1 and CTRL_2, and the node N203, and a waveform of the output signal OUT in FIGS. 6 and 8. FIG. 9 illustrates waveforms from a shutdown state to a state where the level shift circuit is started up and set to be in the operation period by the input signals IN and INB input thereto. The control signal CTRL_2 is a signal indicating the operation period of the level shift circuit, and the control signal CTRL_1 is a signal indicating a second half period in the initial state immediately before the operation period.

As illustrated in FIG. 9, when the input signal IN is at an L level during the operation period, the signal VINB output from the inverter configured with the transistors M101 and M102 is at an H level. Here, the input signal INB is at an H level, and the signal VIN output from the inverter circuit configured with the transistors M103 and M104 is at an L level. In response to the H-level signal VINB, the transistor M106 is turned on, the transistor M502 is turned off, and the node VOUTB_L is set to be at an L level. The stationary-state signal BIAS at an intermediate voltage between the low voltage VDDL and the high voltage VDDH is input to the gates of the transistors M203 and M204. The transistors M203 and M204 are in a half-on state at all times. The voltage of the node N202 is at an L level, and the transistor M201 is turned on. The L-level signal VIN turns off the transistor M105, turns on the transistor M501, and makes the voltage of the node N201 equal to the high voltage VDDH, that is, an H level. As a result, the voltage of the node N202 is fixed at an L level. An L-level signal appearing in the node N202 is output as the output signal OUT from the output terminal OUT through a two-stage inverter configured with the transistors M205 to M208. That is, the L-level input signal IN (H-level input signal INB) causes the L-level output signal OUT to be output from the output terminal OUT. When the H-level input signal IN (L-level input signal INB) is input, the H-level output signal OUT is output from the output terminal OUT.

The transistors M203 and M204 function as a resistive voltage dividing circuit and have a protection effect such that a voltage between the terminals of the thin film transistors M105 and M106 does not exceed the breakdown voltage value.

In the first half of the initial state where the level shift circuit does not operate, the signal VOUT_L is set to be in a high impedance state HiZ (shaded portion in FIG. 9). In the latter half of the initial state immediately before the operation period, the control signal CTRL_2 is set to be at an H level. Thereby, the transistor M5002A is turned on. The resistance value of the transistor M5002A is sufficiently small, the terminals T1 and T2 are short-circuited, and the voltages of the nodes VOUT_L and VOUTB_L are matched to the voltage VSSC. Thereby, the delay Δt1 (see FIG. 3) in the falling time of the node N201 can be eliminated when the level shift circuit starts to operate. Thus, the first embodiment has an effect of reducing ISI of an output signal.

During the operation period, the control signal CTRL_1 is set to be at an H level, and the control signal CTRL_2 is at an L level. Thereby, a path on the low resistance circuit RES_L side is opened, and a path on the high resistance circuit RES_H side is short-circuited. That is, the transistor M5001A is turned on, and the transistor M5002A is turned off. Thereby, the node VOUT_L and the node VOUTB_L are connected to each other by a current path of the transistor M5001A having a relatively high resistance, and thus a through current during operation can be reduced.

As described above, in the present embodiment, the problem in Comparative Example 1 of FIG. 2 can be solved, and it is possible to reduce ISI of an output signal, reduce a through current, and decrease power consumption.

Modification Example 1

Figure 10:
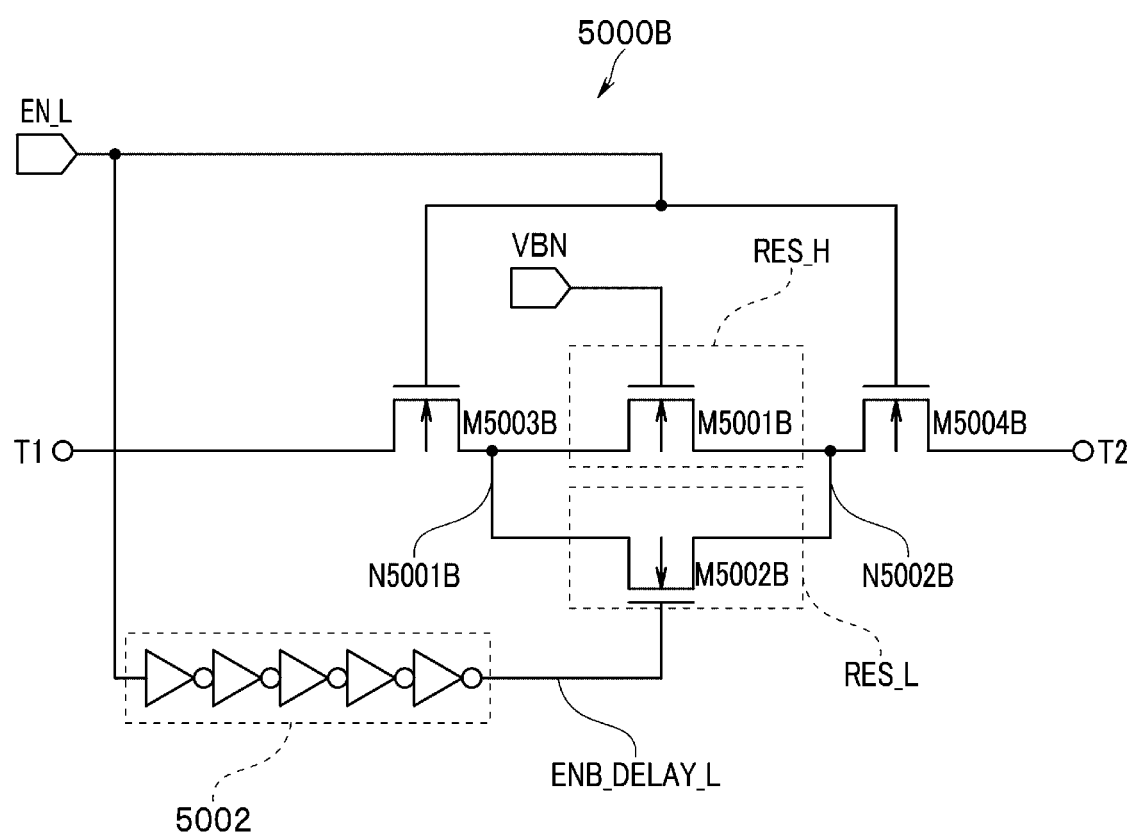
FIG. 10 is a circuit diagram illustrating a first modification example of the variable resistance switch circuit.

FIG. 10 is a circuit diagram illustrating an example of a variable resistance switch circuit 5000B, which is Modification Example 1 of the variable resistance switch circuit 5000. When the variable resistance switch circuit 5000A in FIG. 8 is employed, it is necessary to generate the control signals CTRL_1 and CTRL_2, which increases a circuit scale. Consequently, the variable resistance switch circuit 5000B in FIG. 10 prevents an increase in circuit scale by using an enable signal EN_L for starting up the level shift circuit. The enable signal EN_L rises from an L level to an H level in the initial state before the start-up of the level shift circuit, and remains at an H level during the operation of the level shift circuit. An H level of the enable signal EN_L is the same voltage level as the low voltage VDDL.

The variable resistance switch circuit 5000B is configured with transistors M5001B, M5002B, M5003B, and M5004B, which are thick film NMOS transistors with high threshold voltages, and a delay circuit 5002. The high resistance circuit RES_H is configured with the transistor M5001B, and the low resistance circuit RES_L is configured with the transistor M5002B. A current path of the transistor M5003B, a current path of the transistor M5001B, and a current path of the transistor M5004B are connected in series between the terminal T1 and the terminal T2. A current path of the transistor M5002B is provided between a connection point between one end of the current path of the transistor M5003B and one end of the current path of the transistor M5001B (hereinafter referred to as a node N5001B) and a connection point of the other end of the current path of the transistor M5001B and one end of the current path of the transistor M5004B (hereinafter referred to as a node N5002B). The enable signal EN_L is supplied to gates of the transistors M5003B and M5004B. A control signal VBN of which the level is lower than the level of the enable signal EN_L is supplied to a gate of the transistor M5001B. An H level of the control signal VBN is a minute voltage signal with a voltage level lower than that of the low voltage VDDL, and the transistor M5001B is set to be in a half-on state by the H-level control signal VBN and has a high on-resistance.

The delay circuit 5002 receives an input of the enable signal EN_L, delays and inverts the input enable signal EN_L, and outputs the signal as a delay signal ENB_DELAY_L. The delay circuit 5002 can be configured with cascade-connecting an odd number of inverters. The delay signal ENB_DELAY_L output from the delay circuit 5002 is supplied to the gate of the transistor M5002B.

Figure 11:
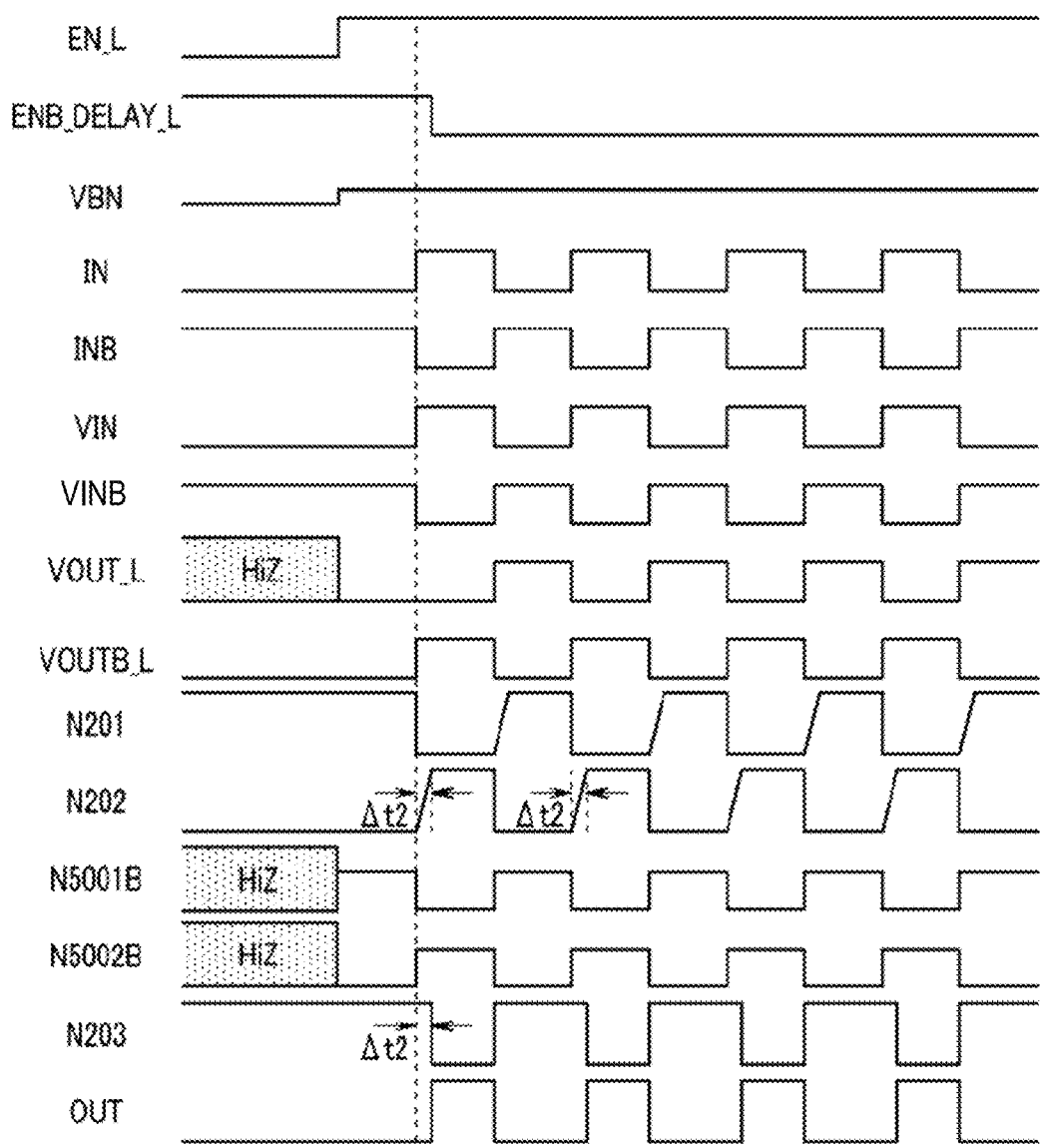
FIG. 11 is a timing chart showing operations of the level shift circuit that implements the first modification example.

Next, operations in Modification Example 1 will be described with reference to a timing chart of FIG. 11. FIG. 11 illustrates waveforms of the enable signal EN_L, the delay signal ENB_DELAY_L, the control signal VBN, the input signals IN and INB, the signals VIN and VINB, the nodes VOUT_L and VOUTB_L and the nodes N201 and N202, and waveforms of the nodes N5001B and N5002B, a waveform of the node N203, and a waveform of the output signal OUT in FIGS. 6 and 10. Similarly to FIG. 9, FIG. 11 illustrates waveforms from a shutdown state to a state where the level shift circuit is started up and set to be in the operation period by the input signals IN and INB input thereto.

In FIG. 11, the waveforms of the input signals IN and INB, the signals VIN and VINB, the nodes VOUT_L, VOUTB_L, N201, N202, and N203, and the output terminal OUT are the same as in FIG. 9. In Modification Example 1, the enable signal EN_L, the delay signal ENB_DELAY_L, and the control signal VBN are employed instead of the control signals CTRL_1 and CTRL_2.

In the first half of the initial state, the enable signals EN_L and VBN are at an L level, and the delay signal ENB_DELAY_L is at an H level. Thus, here, the transistor M5002B is turned on. When the enable signal EN_L instructing the level shift circuit to be started up is set to be at an H level in the initial state, the transistors M5003B and M5004B are turned on. The control signal VBN is also set to be at an H level, and the transistor M5001B is turned on. Since the level of the control signal VBN supplied to the transistor M5001B is sufficiently low, the on-resistance of the transistor M5001B is extremely high. On the other hand, the on-resistances of the transistors M5002B to M5004B are sufficiently low, and the resistance of a current path between the terminals T1 and T2 is sufficiently low. The voltages of the nodes VOUT_L and VOUTB_L match the voltage VSSC, and the node VOUT_L is set to be at an L level due to the cancellation of the HiZ state. Thereby, as illustrated in FIG. 11, it is possible to cancel the delay Δt1 (see FIG. 3) in the falling time of the node N201 and reduce ISI of an output signal.

The enable signal EN_L is delayed and inverted by the delay circuit 5002, and the delay signal ENB_DELAY_L is supplied to the gate of the transistor M5002B. After the operation period is set, the delay signal ENB_DELAY_L is set to be at an L level due to the enable signal EN_L delayed by the delay circuit 5002, and the transistor M5002B is turned off. That is, the terminals T1 and T2 are connected to each other via the current paths of the transistors M5003B, M5001B, and M5004B. Since the on-resistance of the transistor M5001B is extremely high, a through current between the node VOUT_L and the node VOUTB_L is small during the operation period, and power consumption is reduced.

When the level shift circuit is not operating, the enable signal EN_L is at an L level, and the transistors M5003B and M5004B are turned off. Thus, in this case, an open state is set between the terminal T1 and the terminal T2, which leads to an effect of reducing current consumption when not operating.

As such, even in Modification Example 1, the same effects as in the embodiments of FIGS. 6 and 8 can be obtained. In Modification Example 1, the variable resistance switch circuit 5000B is controlled using the enable signal EN_L for instructing the level shift circuit to be started up, which leads to an advantage of simplifying a circuit for generating a control signal.

Modification Example 2

Figure 12:
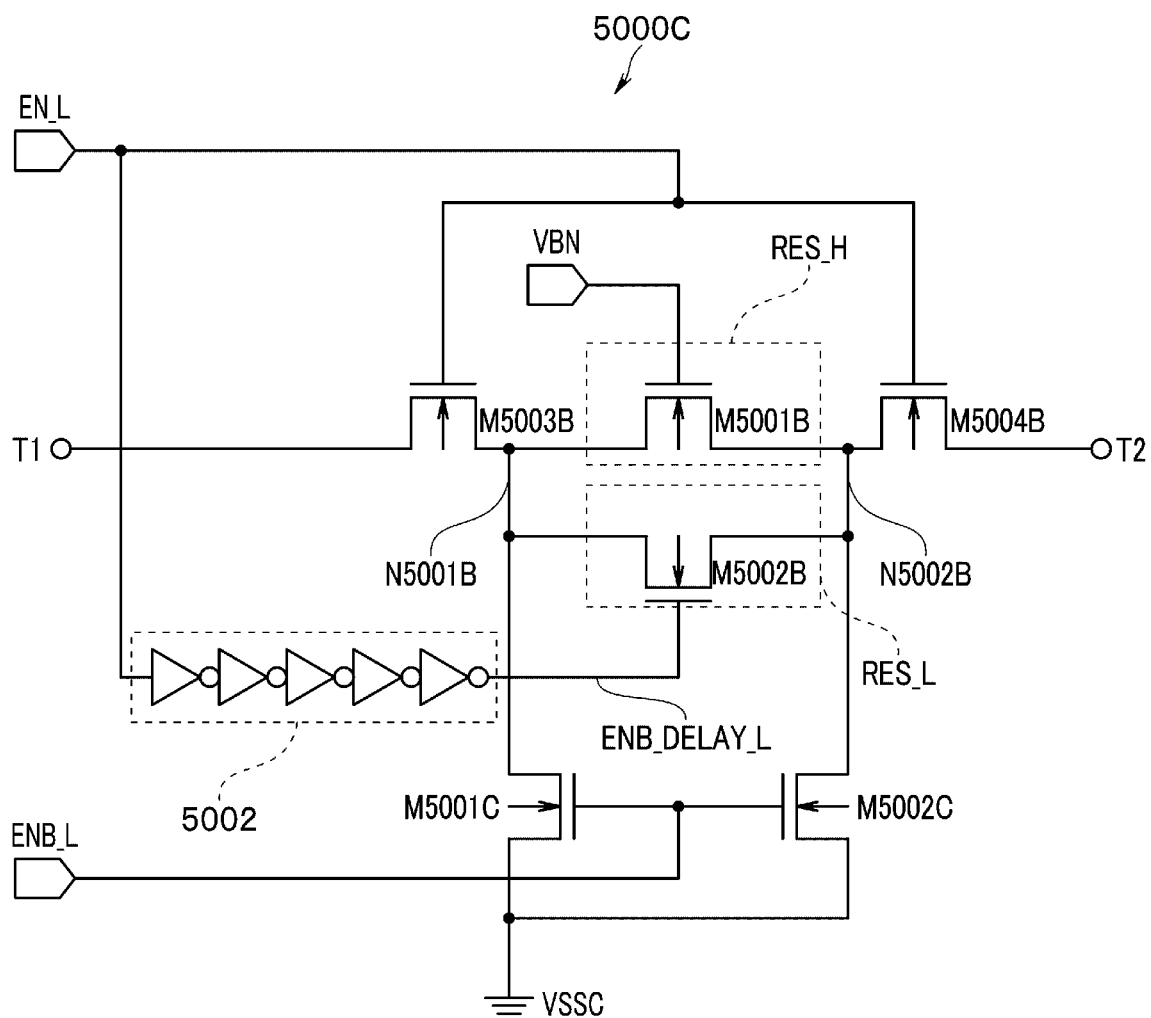
FIG. 12 is a circuit diagram illustrating a second modification example of the variable resistance switch circuit.

FIG. 12 is a circuit diagram illustrating an example of a variable resistance switch circuit 5000C, which is a Modification Example 2 of the variable resistance switch circuit 5000. In FIG. 12, the same components as those in FIG. 10 are denoted by the same reference numerals, and the description thereof is omitted.

When the variable resistance switch circuit 5000B in FIG. 10 is employed, the node N5001B and the node N5002B are in the HiZ state in the initial state of the level shift circuit (shaded portion in FIG. 11). It is considered that such state may cause ISI in the high voltage circuit portion 500 at the start of the operation period. That is, at the start of the operation period, the voltages of the terminals T1 and T2 at both ends of the variable resistance switch 5000B fluctuate, and thus there is a possibility that ISI will occur in the output signal OUT. Consequently, in Modification Example 2, transistors M5001C and M5002C, which are thick film NMOS transistors with a high threshold voltage, are provided. The transistor M5001C has a drain connected to the node N5001B, a source connected to the reference voltage VSSC, and a gate to which an enable inverted signal ENB_L, which is an inverted signal of the enable signal EN_L, is supplied. The transistor M5002C has a drain connected to the node N5002B, a source connected to the reference voltage VSSC, and a gate to which the enable inversion signal ENB_L is supplied.

Figure 13:
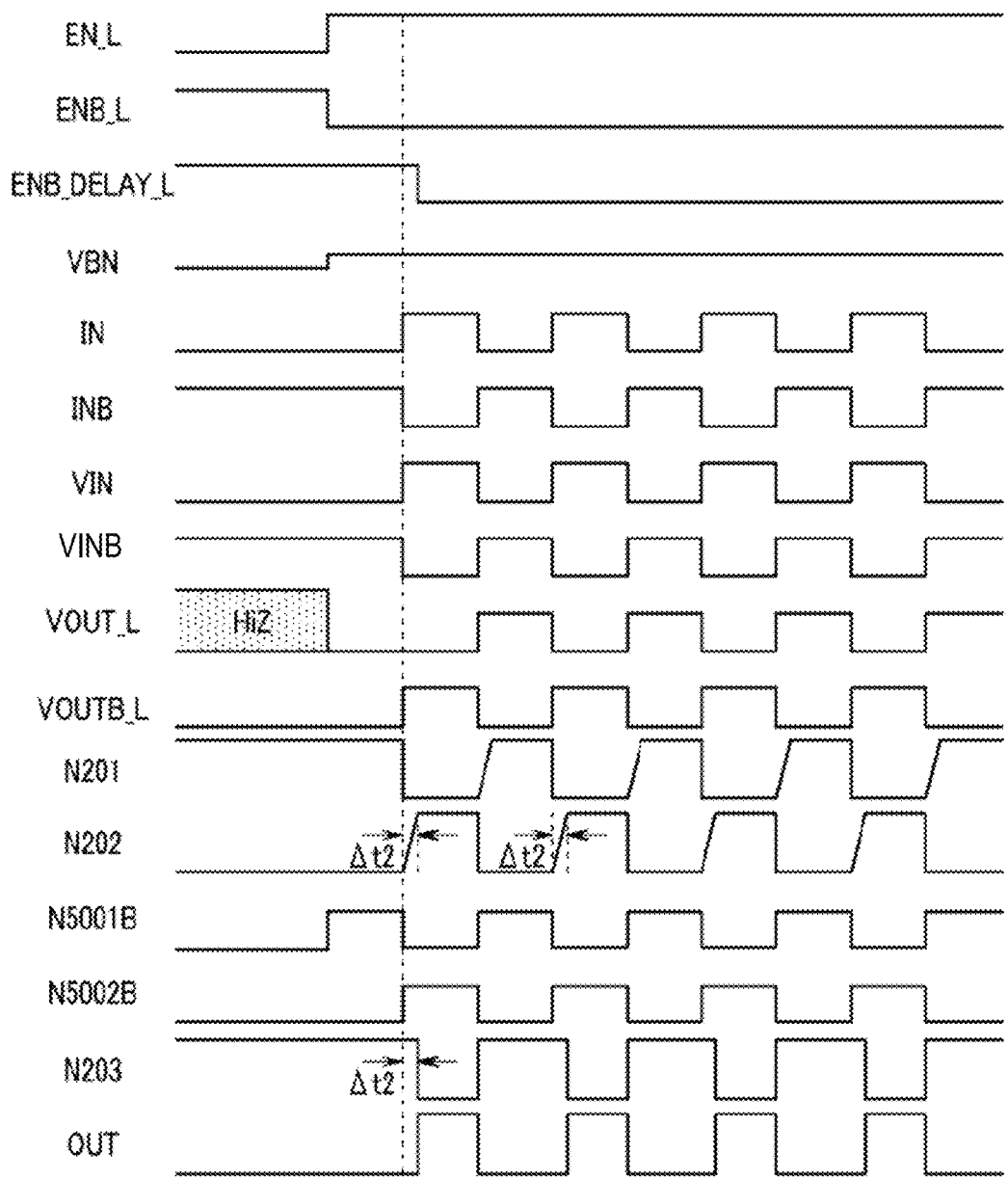
FIG. 13 is a timing chart showing operations of the level shift circuit that implements the second modification example.

Next, operations in Modification Example 2 will be described with reference to a timing chart of FIG. 13. FIG. 13 is different from the timing chart of FIG. 11 in that a waveform of the enable inversion signal ENB_L is added. As it is apparent from comparison between FIG. 13 and FIG. 11, waveforms of the nodes N5001B and N5002B in the initial state in Modification Example 2 are different from those in Modification Example 1.

In the initial state, the enable inversion signal ENB_L is at an H level in a period in which the enable signal EN_L is at an L level. The transistors M5001C and M5002C are turned on by the H-level enable inversion signal ENB_L. Thereby, the nodes N5001B and N5002B are connected to the reference voltage VSSC, and thus the voltages thereof match the reference voltage VSSC, and HiZ is canceled. During the operation period, the enable inversion signal ENB_L is set to be at an L level, and the transistors M5001C and M5002C are turned off. Thereby, the operation of the variable resistance switch circuit 5000C during the operation period is the same as the operation of the variable resistance switch circuit 5000B.

As such, also in Modification Example 2, the same effects as those in the embodiments of FIGS. 6 and 8 can be obtained. In Modification Example 2, it is possible to prevent the HiZ state from being set in the node in the variable resistance switch circuit and to more reliably reduce ISI of an output signal.

The variable resistance switches 5000A, 5000B, and 5000C may be configured with P-type thick film transistors. Here, the same operations as those of the variable resistance switches 5000A, 5000B, and 5000C can be performed by inverting the logic of each control signal.

Second Embodiment

Figure 14:
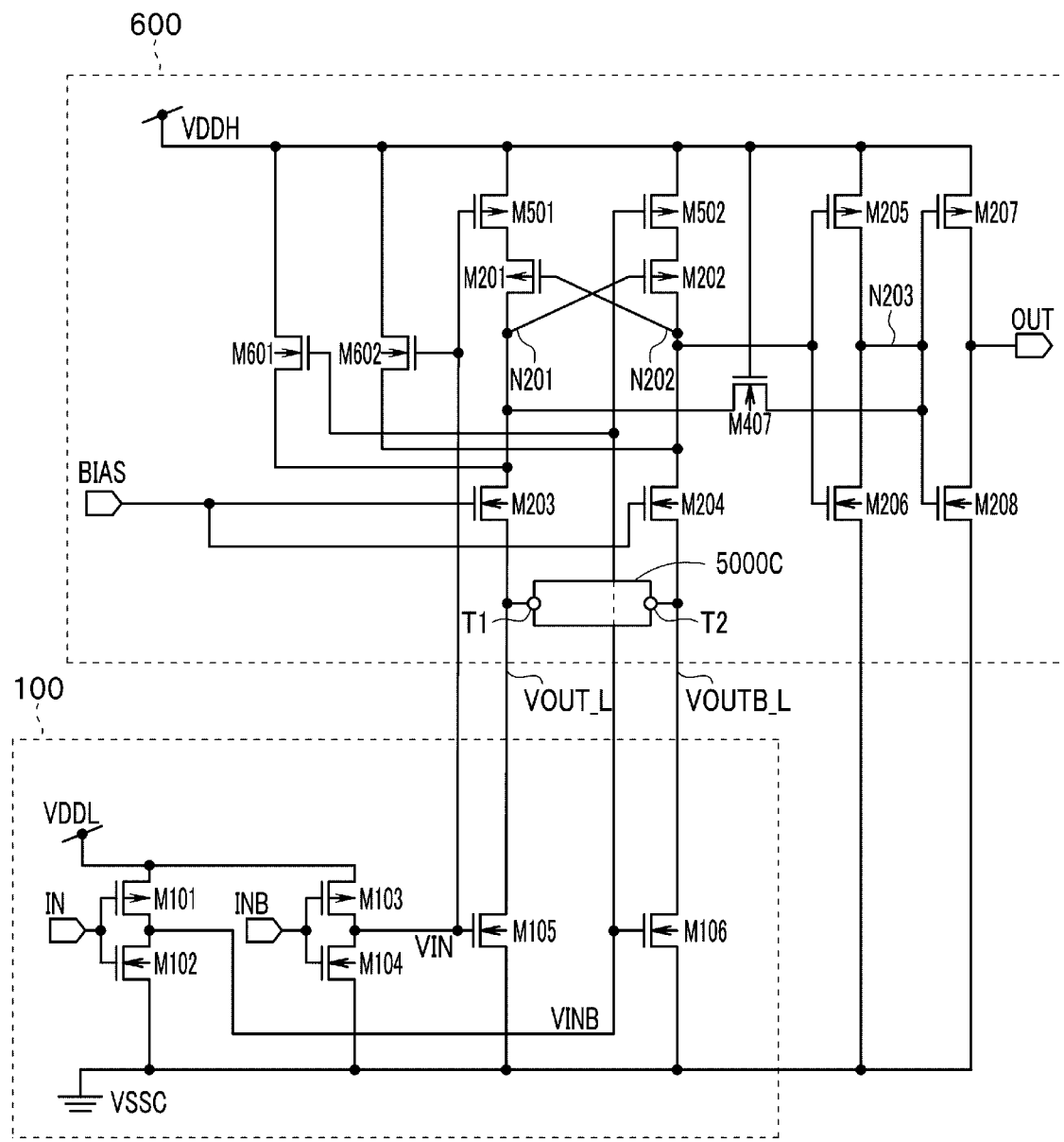
FIG. 14 is a circuit diagram illustrating a level shift circuit including a semiconductor integrated circuit according to a second embodiment.

FIG. 14 is a circuit diagram illustrating a semiconductor integrated circuit according to a second embodiment. In FIG. 14, the same components as those in FIGS. 4, 6 and 12 are denoted by the same reference numerals, and the description thereof is omitted.

In the level shift circuit according to the first embodiment, similarly to Comparative Example 1, rising times of the nodes N201 and N202 are delayed by Δt2 (see FIG. 13) from falling times thereof, and the duty cycle of the output signal OUT deteriorates. To solve such problem, the present embodiment is different from the first embodiment in that a high voltage circuit portion 600 in which transistors M407, M601, and M602, which are thick film NMOS transistors with a high threshold voltage, are added to the high voltage circuit portion 500 in FIG. 6.

The transistor M601 has a drain connected to the high voltage wiring VDDH, a source connected to the node N201, and a gate to which the signal VINB is supplied. The transistor M602 has a drain connected to the high voltage wiring VDDH, a source connected to the node N202, and a gate to which the signal VIN is supplied.

As described above, the transistor M201 has a rising time slower than in the transistor M105, and the transistor M202 has a rising time slower than in the transistor M106. However, the transistor M602 is turned on when the signal VIN is set to be at an H level (the signal VINB is set to be at an L level) to short-circuit the node N202 and the high voltage wiring VDDH and rapidly charge the node N202 to an H level. The transistor M601 is turned on when the signal VIN is set to be at an L level (the signal VINB is set to be at an H level) to short-circuit the node N201 and the high voltage wiring VDDH and rapidly charge the node N201 to an H level. Thereby, the rising times of the nodes N201 and N202 can be made faster.

Similarly to Comparative Example 2, a current path of the transistor M407 is provided between the node N201 and the node N203. In the transistor M407, one end of a source-drain path is connected to the node N201, the other end is connected to the node N203, and a gate is connected to the high voltage wiring VDDH. The transistor M407 is set to be turned on at all times while the high voltage power supply supplying the high voltage VDDH is turned on. Thereby, the transistor M407 changes the voltage of the node N203 to an L level when the node N201 transitions from an H level to an L level.

In the embodiment configured as such, the transistor M407 is set to be turned on at all times and short-circuits the nodes N201 and N203 while the high voltage power supply supplying the high voltage VDDH is turned on. The node N203 rapidly transitions to an L level together with the falling of the node N201. As such, it is possible to improve the duty cycle by eliminating the influence of the delay Δt2 in the rising time of the node N202 on the output signal OUT.

The transistors M601 and M602 short-circuit the nodes N201 and N202 to the high voltage wiring VDDH, respectively, when the nodes N201 and N202 transition to an H level. Thereby, the rising times of the nodes N201 and N202 can be made faster.

As described above, in the present embodiment, the rising times of the nodes N201 and N202 are made faster, and the node N203 is also configured to fall due to the falling of the node N201. It is possible to bring the duty cycle of the output signal OUT closer to 50% by making the falling of the node N203 faster.

Third Embodiment

Figure 15:
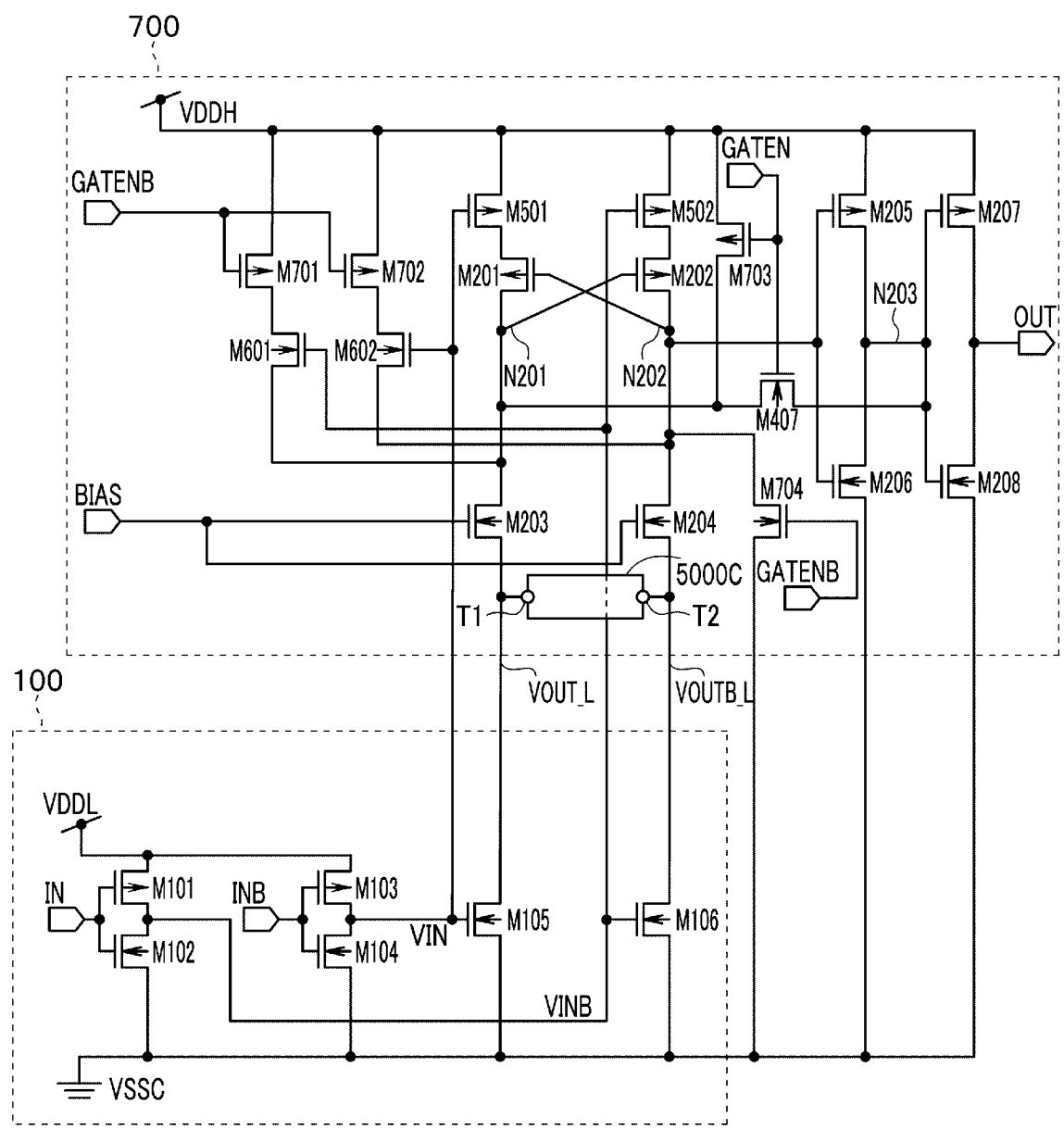
FIG. 15 is a circuit diagram illustrating a level shift circuit including a semiconductor integrated circuit according to a third embodiment.

FIG. 15 is a circuit diagram illustrating a semiconductor integrated circuit according to a third embodiment. In FIG. 15, the same components as those in FIG. 14 are denoted by the same reference numerals, and the description thereof is omitted. The present embodiment makes it possible to reduce a standby leakage current.

The present embodiment is different from the second embodiment in that a high voltage circuit portion 700 in which transistors M701, M702, and M703 for gating, which are thick film PMOS transistors with a high threshold voltage, and a transistor M704 for gating, which is a thick film NMOS transistor with a high threshold voltage, are added to the high voltage circuit portion 600 in FIG. 14 is employed.

Current paths of the transistors M601 and M602 are connected to the high voltage wiring VDDH via current paths of the transistors M701 and M702, respectively. The transistor M701 has a source connected to the high voltage wiring VDDH, a drain connected to a drain of the transistor M601, and a gate to which a control signal GATENB is supplied. The transistor M702 has a source connected to the high voltage wiring VDDH, a drain connected to a drain of the transistor M602, and a gate to which the control signal GATENB is supplied.

The control signal GATENB is a signal that is set to be at an H level when power is supplied but before an enable signal for operating the level shift circuit is supplied (hereinafter referred to as a standby state), and is set to be at an L level during the operation period. Thus, the transistors M701 and M702 are turned off in a standby state to prevent the high voltage wiring VDDH and the nodes N201 and N202 from being short-circuited.

A current path of the transistor M703 is further provided between the node N201 and the high voltage wiring VDDH. The transistor M703 has a source connected to the high voltage wiring VDDH, a drain connected to the node N201, and a gate to which a control signal GATEN is supplied. The control signal GATEN is an inverted signal of the control signal GATENB, and is a signal that is set to be at an L level in a standby state and set to be at an H level during the operation period. The transistor M703 is turned on in a standby state to short-circuit the high voltage wiring VDDH and the node N201 and prevent the node N201 from being set to be in the HiZ state.

A current path of the transistor M704 is further provided between the node N202 and the reference voltage VSSC. The transistor M704 has a drain connected to the node N202, a source connected to the reference voltage VSSC, and a gate to which the control signal GATENB is supplied. The transistor M704 is turned on in a standby state to short-circuit the node N202 and the reference voltage VSSC and prevent the node N202 from being set to be in the HiZ state.

In the present embodiment, the control signal GATEN is supplied to the gate of the transistor M407. Thereby, the transistor M407 is turned off in a standby state of the level shift circuit and is turned on at all times during the operation period.

In the embodiment configured as such, the transistor M703 is turned on in a standby state by the application of the L-level control signal GATEN and has an ISI countermeasure effect of stabilizing the output signal OUT by fixing the node N201 to the voltage of the high voltage wiring VDDH. Similarly, the transistor M704 is turned on in a standby state by the application of the H-level control signal GATENB and has an ISI countermeasure effect of stabilizing the output signal OUT by fixing the node N202 to the voltage VSSC of the reference voltage VSSC.

In a standby state, the H-level control signal GATENB is applied to the gates of the transistors M701 and M702. Thereby, the transistors M701 and M702 are turned off in the standby state, and the standby leakage current when not operating can be reduced.

As described above, the present embodiment has an ISI countermeasure effect of stabilizing the output signal OUT by reducing the standby leakage current and eliminating the HiZ state in a part of the semiconductor integrated circuit in a standby state.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor integrated circuit for converting a differential first signal having a first voltage into a second signal having a second voltage that is higher than the first voltage, the semiconductor integrated circuit comprising:

a first circuit configured to generate a differential third signal based on the first signal; and a second circuit configured to generate the second signal from the third signal, wherein the second circuit includes a first signal line and a second signal line for transmitting the third signal from the first circuit to the second circuit; and a third circuit including a first terminal connected to the first signal line and a second terminal connected to the second signal line, wherein the third circuit includes first and second electrical paths with different electrical resistances, that are connected in parallel between the first terminal and the second terminal, and is controlled to switch between the first and second electrical paths.

2. The semiconductor integrated circuit according to claim 1, wherein
the first electrical path includes a first transistor having a first gate that is controlled according to a first control signal, and
the second electrical path includes a second transistor having a second gate that is controlled according to a second control signal.

3. The semiconductor integrated circuit according to claim 1, wherein
the first electrical path includes a first transistor, a second transistor, and a third transistor between the first terminal and the second terminal, the transistors having respective current paths being connected to each other in series,
the second electrical path includes a fourth transistor having a current path connected to the current path of the second transistor in parallel,
the third circuit is controlled to switch to the first electrical path by supplying respective enable signals to the first, second, and third transistors, and
the third circuit is controlled to switch to the second electrical path by supplying a signal obtained by delaying the enable signal supplied to the first or third transistor.

4. The semiconductor integrated circuit according to claim 3, wherein the third circuit further comprises:
a fifth transistor having a current path connected between one end of the current path of the fourth transistor and a reference voltage, the fifth transistor being controlled based on the enable signal; and
a sixth transistor having a current path connected between the other end of the current path of the fourth transistor and the reference voltage, the sixth transistor being controlled based on the enable signal.

5. The semiconductor integrated circuit according to claim 1, further comprising:
a seventh transistor having a current path connected between a first node at one end of the first signal line and a wiring to which the second voltage is supplied and having a gate connected to a second node at one end of the second signal line;
an eighth transistor having a current path connected between the second node and the wiring to which the second voltage is supplied and having a gate connected to the first node;
a first inverter including an input end connected to the second node;
a second inverter including an input end connected to an output end of the first inverter; and
a ninth transistor having a current path connected between the first node and the input end of the second inverter.

6. The semiconductor integrated circuit according to claim 5, further comprising:
- a tenth transistor having a current path connected between the wiring to which the second voltage is supplied and the first node, and becoming electrically conductive when the eighth transistor is turned on; and
- an eleventh transistor having a current path connected between the wiring to which the second voltage is supplied and the second node, the eleventh transistor becoming electrically conductive when the seventh transistor is turned on.

7. The semiconductor integrated circuit according to claim 6, further comprising:
- a twelfth transistor having a current path connected between the wiring to which the second voltage is supplied and the current path of the tenth transistor, the twelfth transistor being turned off when the second circuit is not operating;
- a thirteenth transistor having a current path connected between the wiring to which the second voltage is supplied and the current path of the eleventh transistor, the thirteenth transistor being turned off when the second circuit is not operating;
- a fourteenth transistor having a current path connected between the wiring to which the second voltage is supplied and the first node, the fourteenth transistor becoming electrically conductive when the second circuit is not operating; and
- a fifteenth transistor having a current path connected between the second node and a reference voltage, the fifteenth transistor becoming electrically conductive when the second circuit is not operating.

8. An interface device comprising:
- a level shift circuit including a semiconductor integrated circuit for converting a differential first signal having a first voltage into a second signal having a second voltage that is higher than the first voltage; and
- a buffer receiving a signal output by the level shift circuit, wherein the semiconductor integrated circuit comprises:
- a first circuit configured to generate a differential third signal based on the first signal; and
- a second circuit configured to generate the second signal from the third signal, wherein the second circuit includes a first signal line and a second signal line for transmitting the third signal from the first circuit to the second circuit; and
- a third circuit including a first terminal connected to the first signal line and a second terminal connected to the second signal line, wherein the third circuit includes first and second electrical paths with different electrical resistances, that are connected in parallel between the first terminal and the second terminal, and is controlled to switch between the first and second electrical paths.

9. The interface device according to claim 8, wherein
the first electrical path includes a first transistor having a first gate that is controlled according to a first control signal, and
the second electrical path includes a second transistor having a second gate that is controlled according to a second control signal.

10. The interface device according to claim 8, wherein
the first electrical path includes a first transistor, a second transistor, and a third transistor between the first terminal and the second terminal, the transistors having respective current paths being connected to each other in series,
the second electrical path includes a fourth transistor having a current path connected to the current path of the second transistor in parallel,
the third circuit is controlled to switch to the first electrical path by supplying respective enable signals to the first, second, and third transistors, and
the third circuit is controlled to switch to the second electrical path by supplying a signal obtained by delaying the enable signal supplied to the first or third transistor.

11. The interface device according to claim 8, wherein the third circuit further comprises:
- a fifth transistor having a current path connected between one end of the current path of the fourth transistor and a reference voltage, the fifth transistor being controlled based on the enable signal; and
- a sixth transistor having a current path connected between the other end of the current path of the fourth transistor and the reference voltage, the sixth transistor being controlled based on the enable signal.

12. The interface device according to claim 8, wherein the semiconductor integrated circuit further comprises:
- a seventh transistor having a current path connected between a first node at one end of the first signal line and a wiring to which the second voltage is supplied and having a gate connected to a second node at one end of the second signal line;
- an eighth transistor having a current path connected between the second node and the wiring to which the second voltage is supplied and having a gate connected to the first node;
- a first inverter including an input end connected to the second node;
- a second inverter including an input end connected to an output end of the first inverter; and
- a ninth transistor having a current path connected between the first node and the input end of the second inverter.

13. The interface device according to claim 12, wherein the semiconductor integrated circuit further comprises:
- a tenth transistor having a current path connected between the wiring to which the second voltage is supplied and the first node, and becoming electrically conductive when the eighth transistor is turned on; and
- an eleventh transistor having a current path connected between the wiring to which the second voltage is supplied and the second node, the eleventh transistor becoming electrically conductive when the seventh transistor is turned on.

14. The interface device according to claim 13, wherein the semiconductor integrated circuit further comprises:
- a twelfth transistor having a current path connected between the wiring to which the second voltage is supplied and the current path of the tenth transistor, the twelfth transistor being turned off when the second circuit is not operating;
- a thirteenth transistor having a current path connected between the wiring to which the second voltage is supplied and the current path of the eleventh transistor, the thirteenth transistor being turned off when the second circuit is not operating;
- a fourteenth transistor having a current path connected between the wiring to which the second voltage is supplied and the first node, the fourteenth transistor becoming electrically conductive when the second circuit is not operating; and
- a fifteenth transistor having a current path connected between the second node and a reference voltage, the fifteenth transistor becoming electrically conductive when the second circuit is not operating.

15. A memory system comprising:
a memory controller including an interface device having a level shift circuit including a semiconductor integrated circuit for converting a differential first signal having a first voltage into a second signal having a second voltage that is higher than the first voltage, and a buffer receiving a signal output by the level shift circuit, and a control circuit configured to control the interface device; and
a semiconductor storage device configured to store data transmitted from the memory controller via the interface device,
wherein the semiconductor integrated circuit comprises:
a first circuit configured to generate a differential third signal based on the first signal; and
a second circuit configured to generate the second signal from the third signal, wherein the second circuit includes a first signal line and a second signal line for transmitting the third signal from the first circuit to the second circuit; and
a third circuit including a first terminal connected to the first signal line and a second terminal connected to the second signal line, wherein the third circuit includes first and second electrical paths with different electrical resistances, that are connected in parallel between the first terminal and the second terminal, and is controlled to switch between the first and second electrical paths.

16. The memory system according to claim 15, wherein the first electrical path includes a first transistor having a first gate that is controlled according to a first control signal, and
the second electrical path includes a second transistor having a second gate that is controlled according to a second control signal.

17. The memory system according to claim 15, wherein the first electrical path includes a first transistor, a second transistor, and a third transistor between the first terminal and the second terminal, the transistors having respective current paths being connected to each other in series,
the second electrical path includes a fourth transistor having a current path connected to the current path of the second transistor in parallel,
the third circuit is controlled to switch to the first electrical path by supplying respective enable signals to the first, second, and third transistors, and
the third circuit is controlled to switch to the second electrical path by supplying a signal obtained by delaying the enable signal supplied to the first or third transistor.

18. The memory system according to claim 15, wherein the third circuit further comprises:
a fifth transistor having a current path connected between one end of the current path of the fourth transistor and a reference voltage, the fifth transistor being controlled based on the enable signal; and
a sixth transistor having a current path connected between the other end of the current path of the fourth transistor and the reference voltage, the sixth transistor being controlled based on the enable signal.

19. The memory system according to claim 15, wherein the semiconductor integrated circuit further comprises:
a seventh transistor having a current path connected between a first node at one end of the first signal line and a wiring to which the second voltage is supplied and having a gate connected to a second node at one end of the second signal line;
an eighth transistor having a current path connected between the second node and the wiring to which the second voltage is supplied and having a gate connected to the first node;
a first inverter including an input end connected to the second node;
a second inverter including an input end connected to an output end of the first inverter; and
a ninth transistor having a current path connected between the first node and the input end of the second inverter.

20. The memory system according to claim 19, wherein the semiconductor integrated circuit further comprises:
a tenth transistor having a current path connected between the wiring to which the second voltage is supplied and the first node, and becoming electrically conductive when the eighth transistor is turned on;
an eleventh transistor having a current path connected between the wiring to which the second voltage is supplied and the second node, the eleventh transistor becoming electrically conductive when the seventh transistor is turned on;
a twelfth transistor having a current path connected between the wiring to which the second voltage is supplied and the current path of the tenth transistor, the twelfth transistor being turned off when the second circuit is not operating;
a thirteenth transistor having a current path connected between the wiring to which the second voltage is supplied and the current path of the eleventh transistor, the thirteenth transistor being turned off when the second circuit is not operating;
a fourteenth transistor having a current path connected between the wiring to which the second voltage is supplied and the first node, the fourteenth transistor becoming electrically conductive when the second circuit is not operating; and
a fifteenth transistor having a current path connected between the second node and a reference voltage, the fifteenth transistor becoming electrically conductive when the second circuit is not operating.

\* \* \* \* \*